United States Patent [19]
Pittman et al.

[11] Patent Number: 5,998,968
[45] Date of Patent: Dec. 7, 1999

[54] METHOD AND APPARATUS FOR RAPIDLY CHARGING AND RECONDITIONING A BATTERY

[75] Inventors: Ronald W. Pittman, Chandler; Hafthor Stefansson, Gilbert, both of Ariz.

[73] Assignee: Ion Control Solutions, LLC, Fort Wayne, Ind.

[21] Appl. No.: 08/900,821

[22] Filed: Jul. 25, 1997

Related U.S. Application Data

[60] Provisional application No. 60/034,921, Jan. 7, 1997.

[51] Int. Cl.[6] .......................... H01M 10/44; H01M 10/46
[52] U.S. Cl. ........................................... 320/130; 320/145
[58] Field of Search .................................... 320/124, 125, 320/128, 130, 133, 139, 141, 145, 157, 159, 160, 162, 164, DIG. 16, FOR 118, FOR 120, FOR 121, FOR 123, FOR 129, FOR 130, FOR 138

[56] References Cited

U.S. PATENT DOCUMENTS

| | | | |
|---|---|---|---|
| 3,597,673 | 8/1971 | Burkett | 320/5 |
| 3,614,583 | 10/1971 | Burkett | 320/5 |
| 3,617,851 | 11/1971 | DuPuy | 320/22 |
| 3,683,256 | 8/1972 | Mas | 320/14 |
| 4,009,429 | 2/1977 | Mullersman | 320/2 |
| 4,016,473 | 4/1977 | Newman | 320/14 |
| 4,211,969 | 7/1980 | Steigerwald | 320/14 |
| 4,253,054 | 2/1981 | Steigerwald | 320/14 |
| 4,302,714 | 11/1981 | Yefsky | 320/5 |
| 4,319,178 | 3/1982 | Sugalski | 320/2 |
| 4,352,052 | 9/1982 | Opper | 320/5 |
| 4,385,269 | 5/1983 | Aspinwall | 320/14 |
| 4,639,655 | 1/1987 | Westhaver | 320/14 |
| 4,654,574 | 3/1987 | Thaler | 320/14 |
| 4,691,158 | 9/1987 | Hashimoto | 320/14 |
| 4,730,153 | 3/1988 | Breting | 320/14 |
| 4,731,573 | 3/1988 | Sexton | 320/14 |
| 4,736,150 | 4/1988 | Wagner | 320/21 |
| 4,740,739 | 4/1988 | Quammen | 320/14 |
| 4,746,852 | 5/1988 | Martin | 320/20 |
| 4,829,225 | 5/1989 | Podrazhansky | 320/14 |
| 4,878,007 | 10/1989 | Gabor | 320/14 |
| 4,918,368 | 4/1990 | Baker | 320/40 |
| 5,223,284 | 6/1993 | Mattsson | 320/14 |
| 5,225,762 | 7/1993 | Langford | 320/20 |
| 5,291,117 | 3/1994 | Rydborn | 320/21 |

(List continued on next page.)

FOREIGN PATENT DOCUMENTS

| | | |
|---|---|---|
| 0 034 003 | 1/1981 | European Pat. Off. . |
| 8149709 | 6/1996 | Japan . |
| WO 91/07000 | 5/1991 | WIPO . |
| WO 93/15543 | 8/1993 | WIPO . |
| WO 94/27352 | 11/1994 | WIPO . |
| WO 95/18485 | 7/1995 | WIPO . |

OTHER PUBLICATIONS

International Search Report Corresponding to PCT/US98/00585.

Communication Relating to Results of the Partial International Search of PCT/US 98/00585, No Date.

*Primary Examiner*—Edward H. Tso
*Attorney, Agent, or Firm*—Baker & Daniels

[57] ABSTRACT

An improved battery charger and reconditioner employs a charging sequence calling for a discharge pulse to be applied substantially immediately before a charging pulse to effectively lower the impedance of the subject battery and to thereby more effectively charge the battery at a lower voltage level. The apparatus and method of the invention enhances the current receiving properties of the battery to lower thermal properties associated with charging and to more efficiently and more rapidly charge a subject battery. The charging sequence reconditions a battery by applying the improved sequence so as to rejuvenate an otherwise damaged battery. The invention also provides a method and means for formatting a battery and for removing dendritic formations which occur in a battery. Further, methods for aborting battery charging and for detecting abnormal conditions are also provided by the present invention.

143 Claims, 13 Drawing Sheets

U.S. PATENT DOCUMENTS

| | | | |
|---|---|---|---|
| 5,463,305 | 10/1995 | Koenck | 320/21 |
| 5,481,174 | 1/1996 | Martin | 320/14 |
| 5,504,415 | 4/1996 | Podrazhansky | 320/18 |
| 5,541,491 | 7/1996 | Yamazaki | 320/22 |
| 5,561,360 | 10/1996 | Ayres | 320/14 |
| 5,617,005 | 4/1997 | Brown, Jr. | 320/21 |
| 5,619,118 | 4/1997 | Reipur | 320/31 |

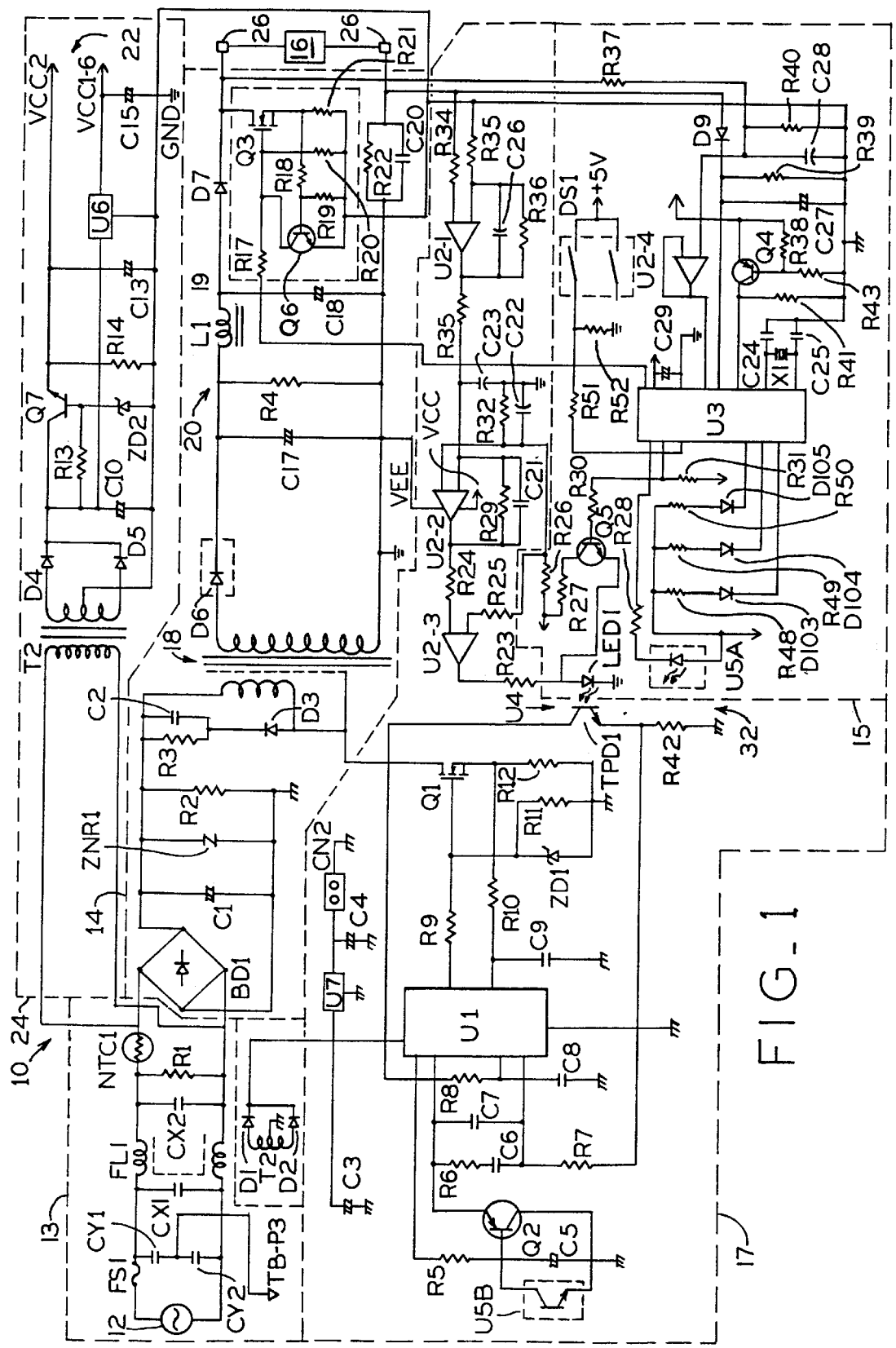
FIG_1

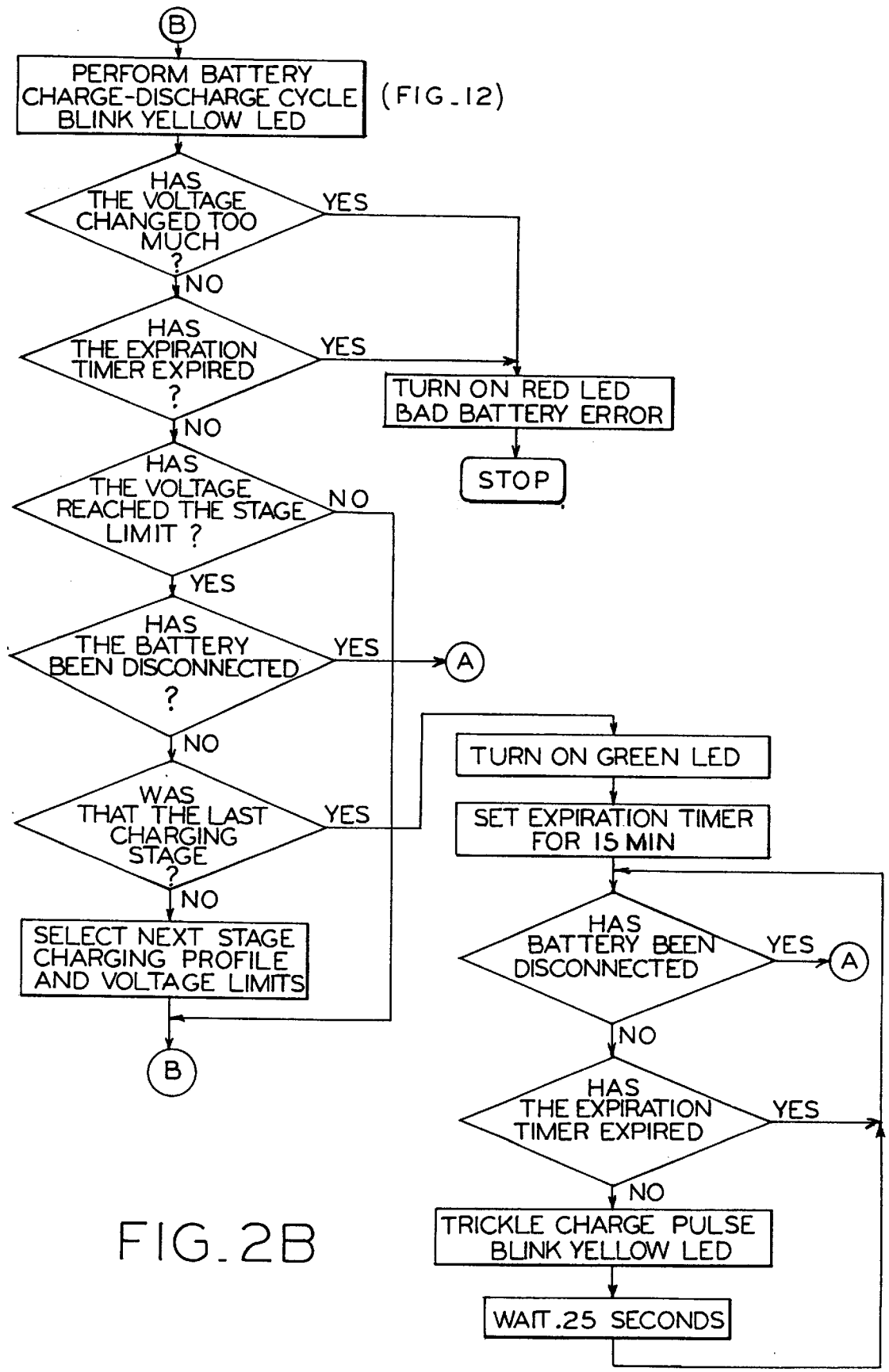
FIG_2B

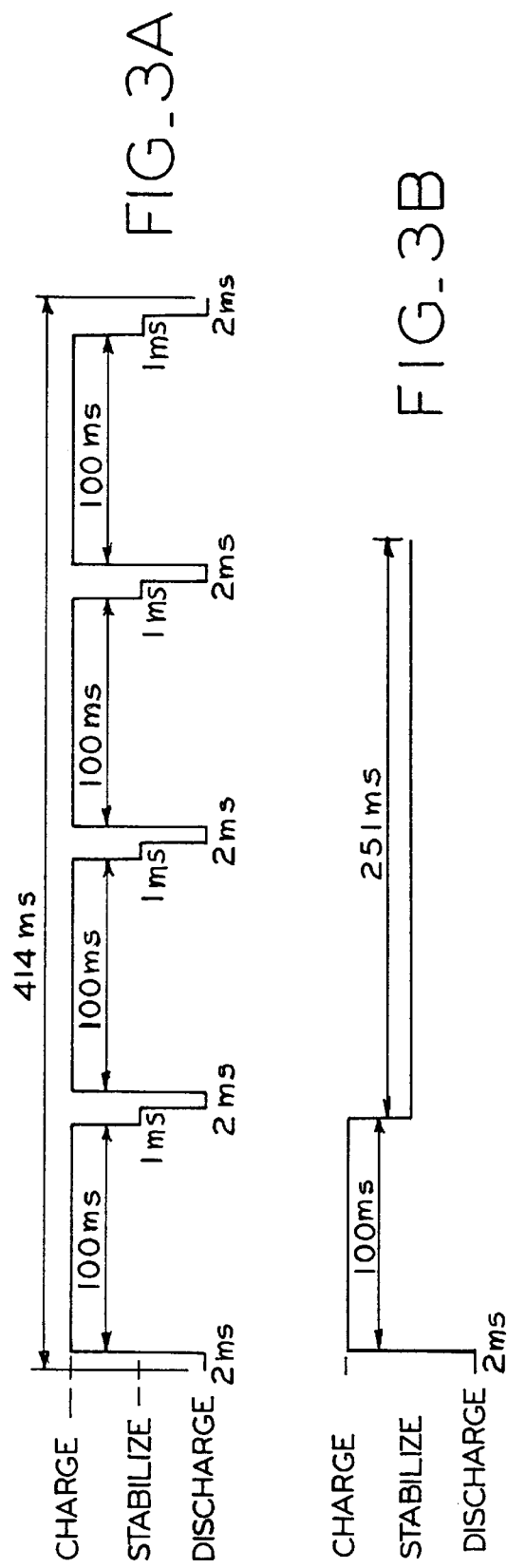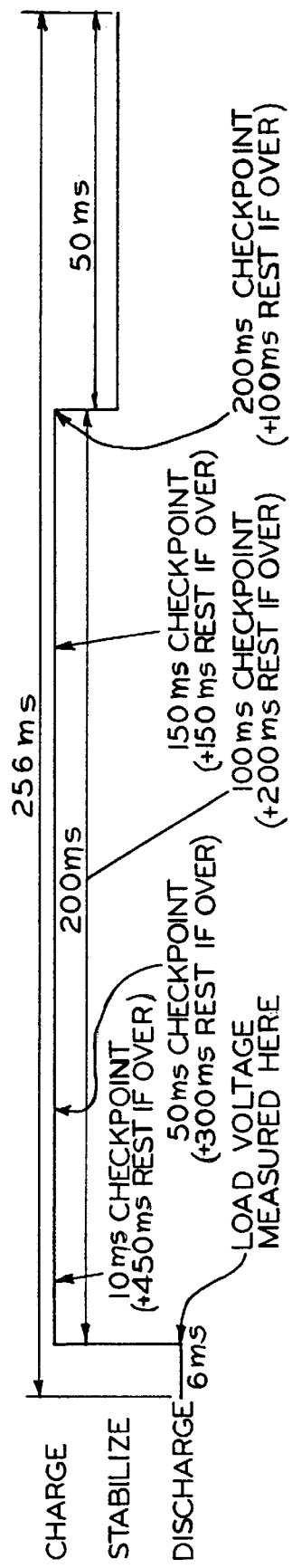

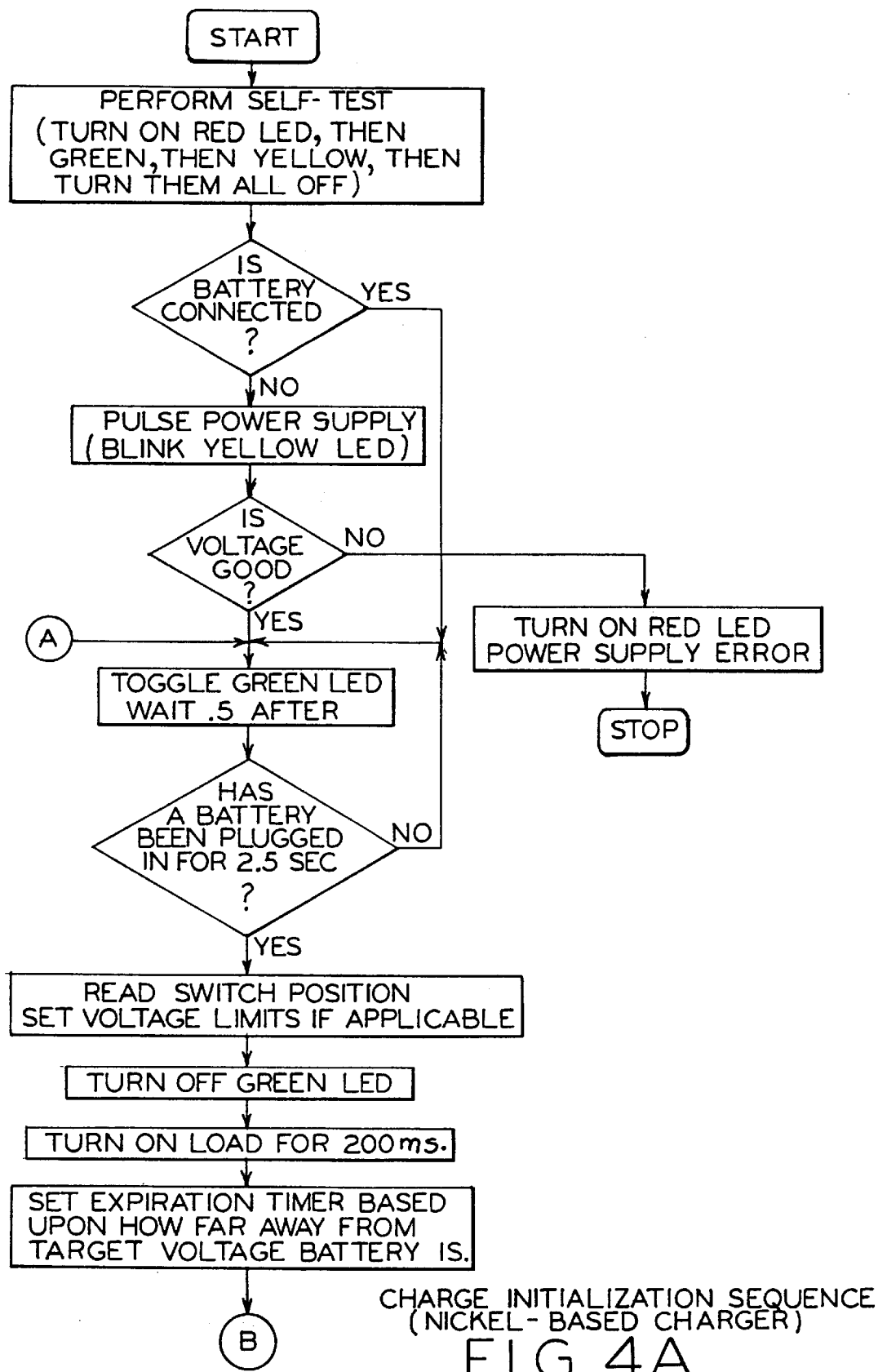

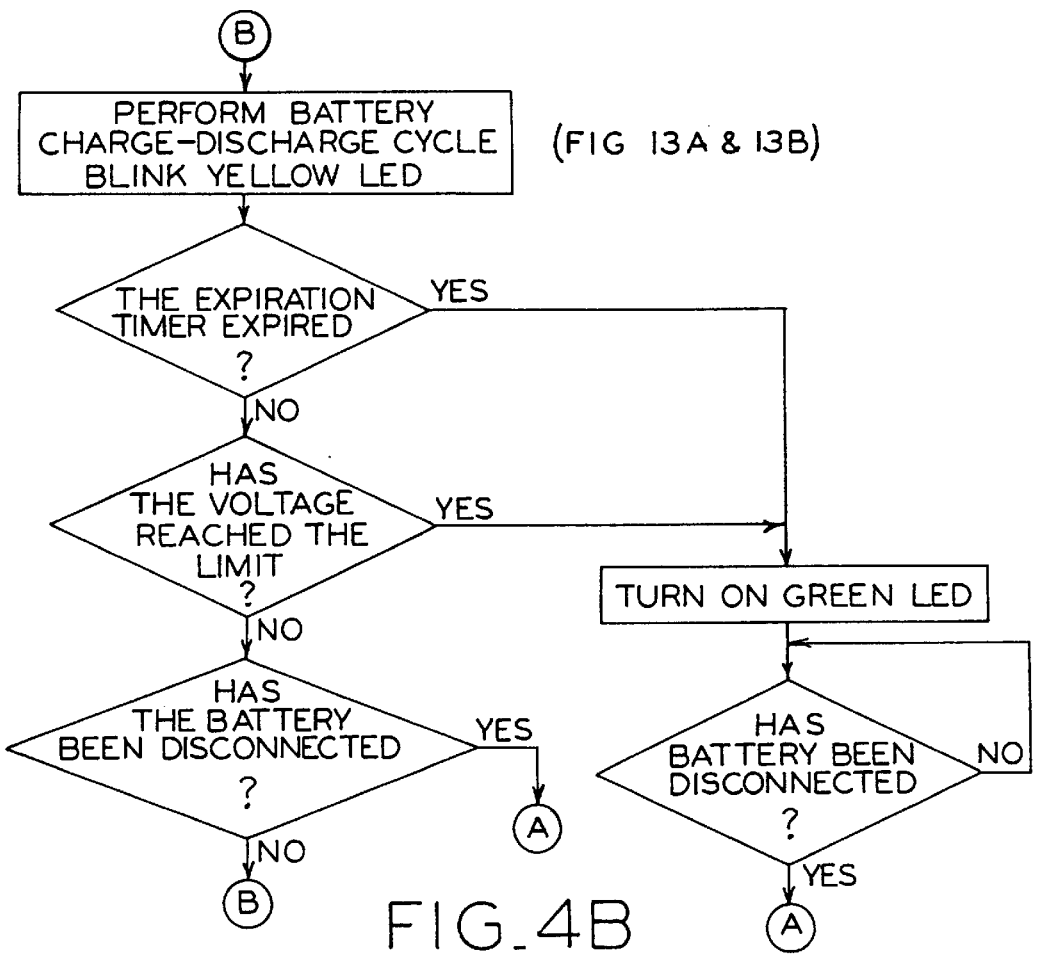
FIG_4B
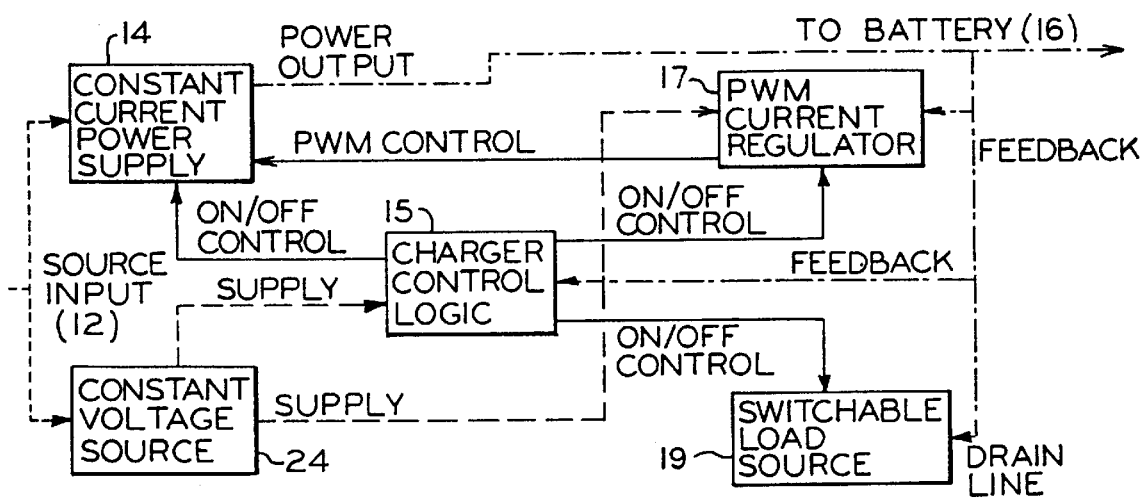
FIG_6
LEGEND
------ SOURCE INPUT
——— LOGIC
– – – V SUPPLY
—--— OUTPUT TO BATTERY

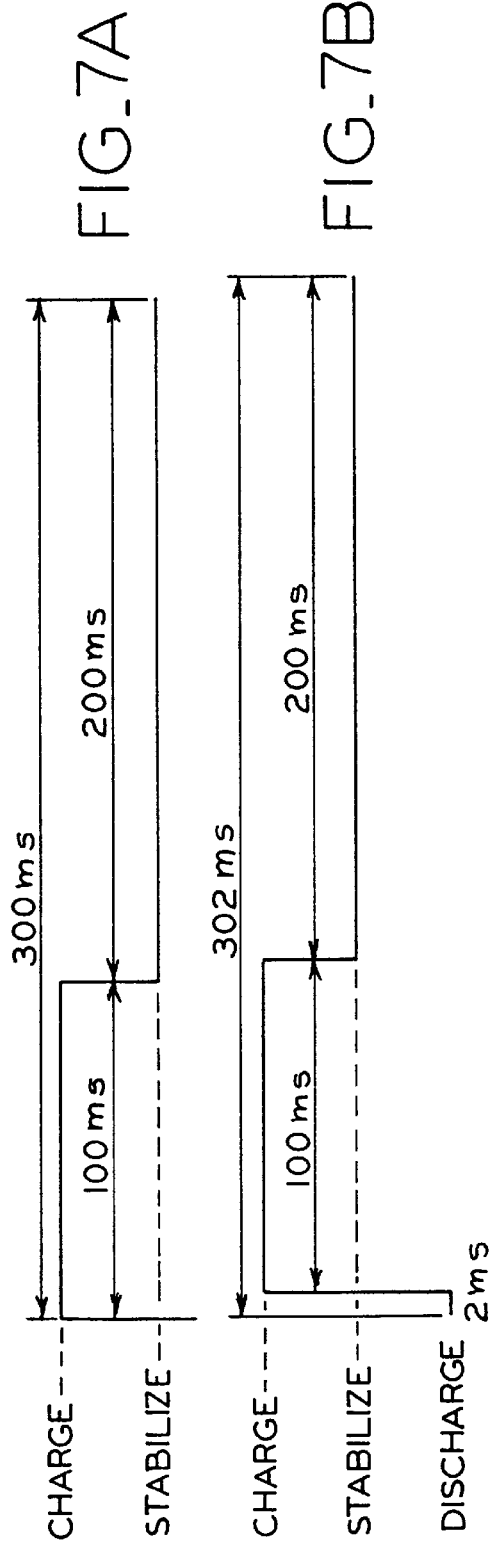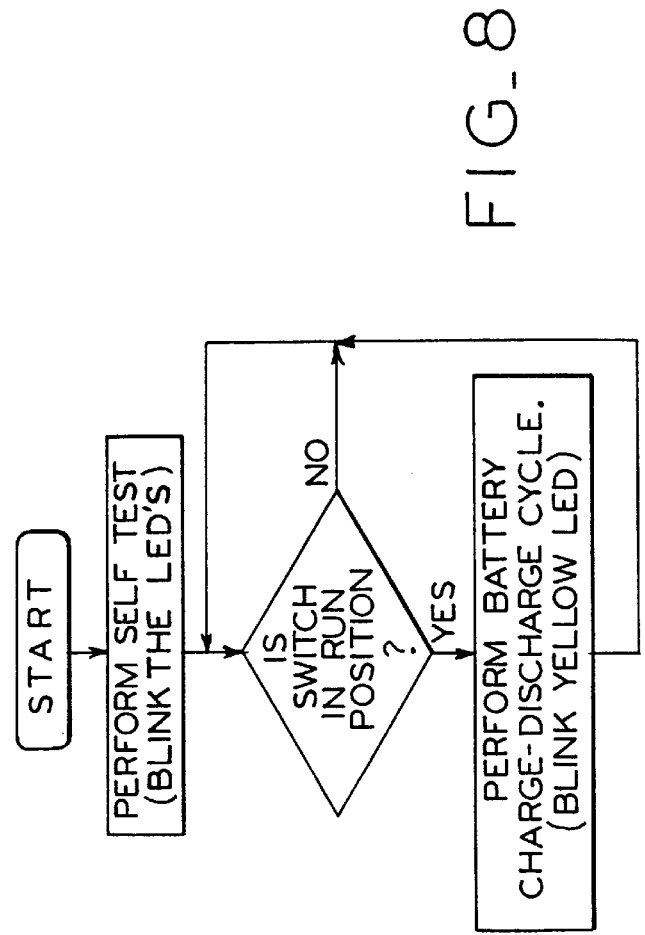

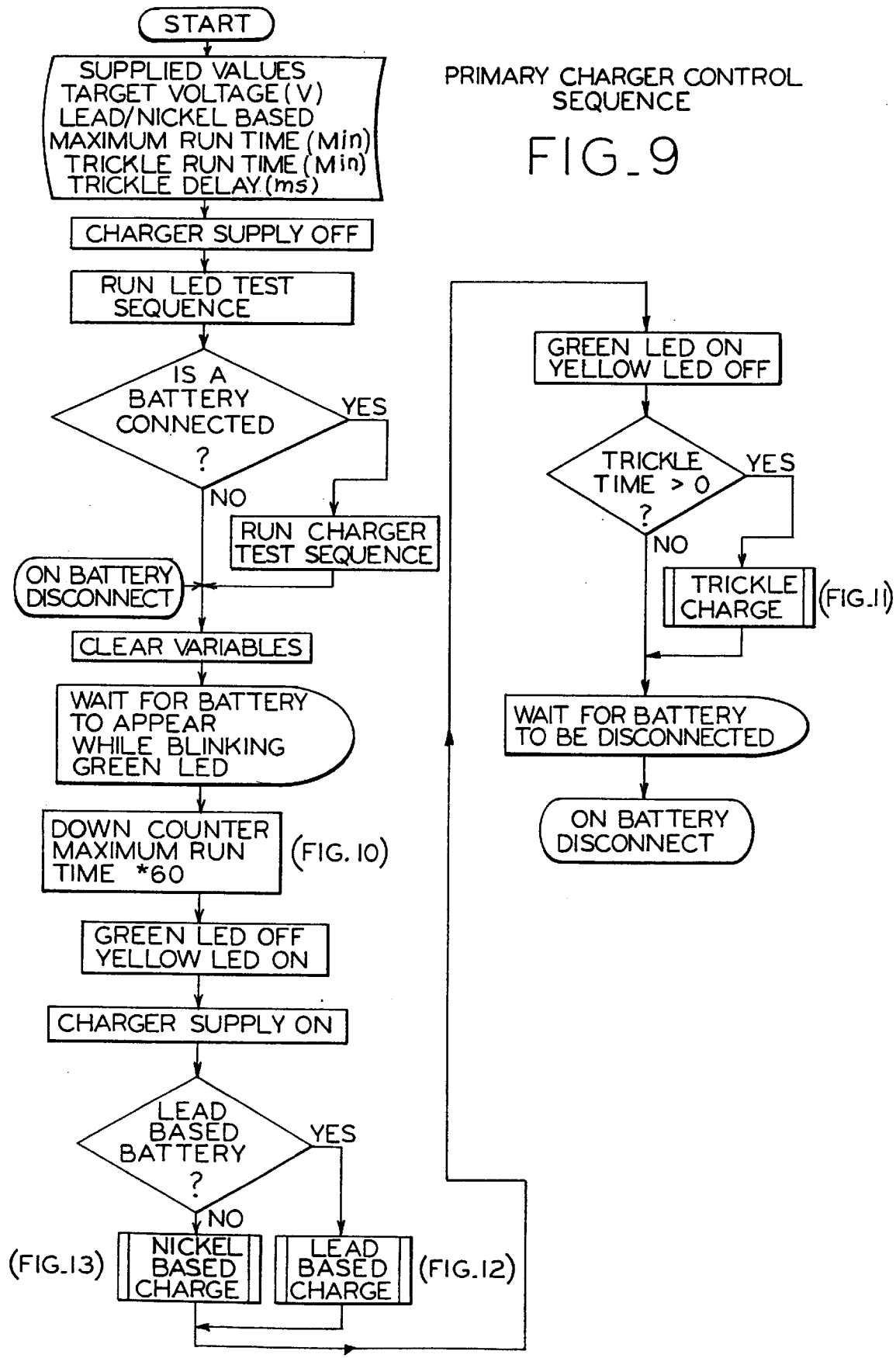
PRIMARY CHARGER CONTROL SEQUENCE
FIG_9

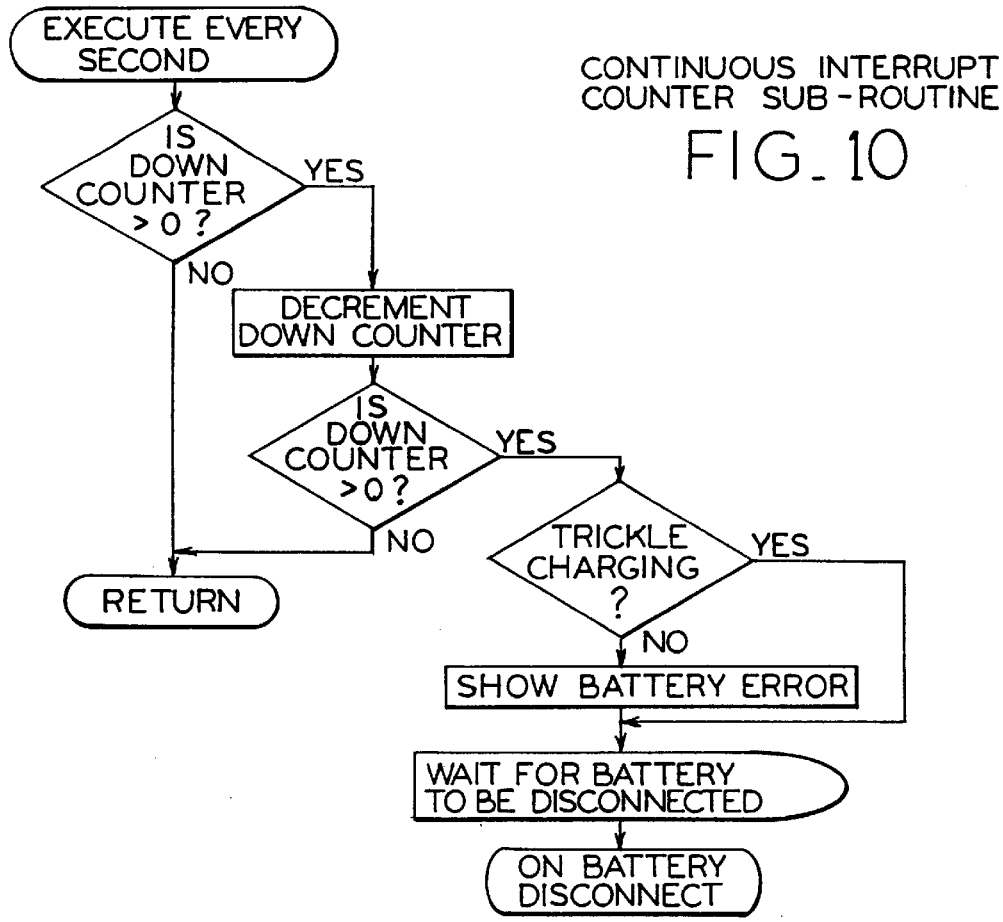
CONTINUOUS INTERRUPT
COUNTER SUB-ROUTINE
FIG_10
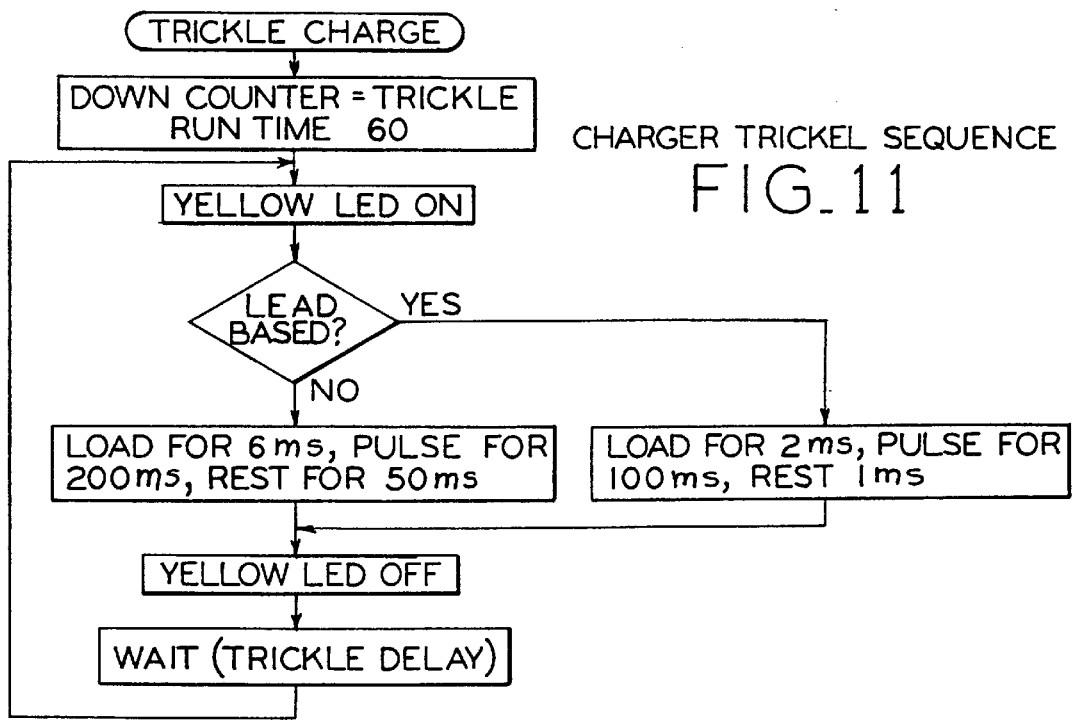
CHARGER TRICKEL SEQUENCE
FIG_11

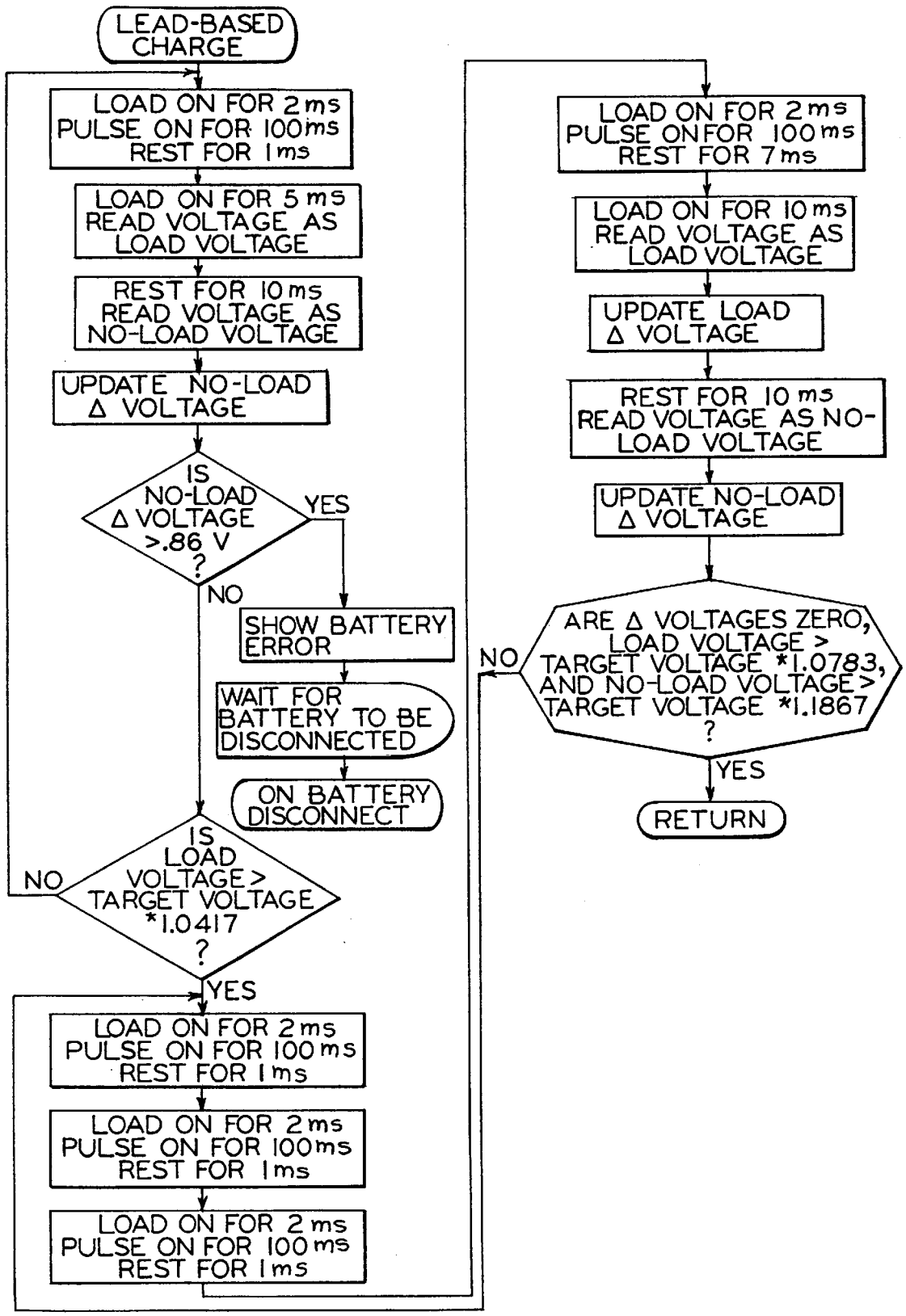
LEAD-BASED CHARGE SEQUENCE
FIG_12

NICKEL-BASED CHARGE SEQUENCE

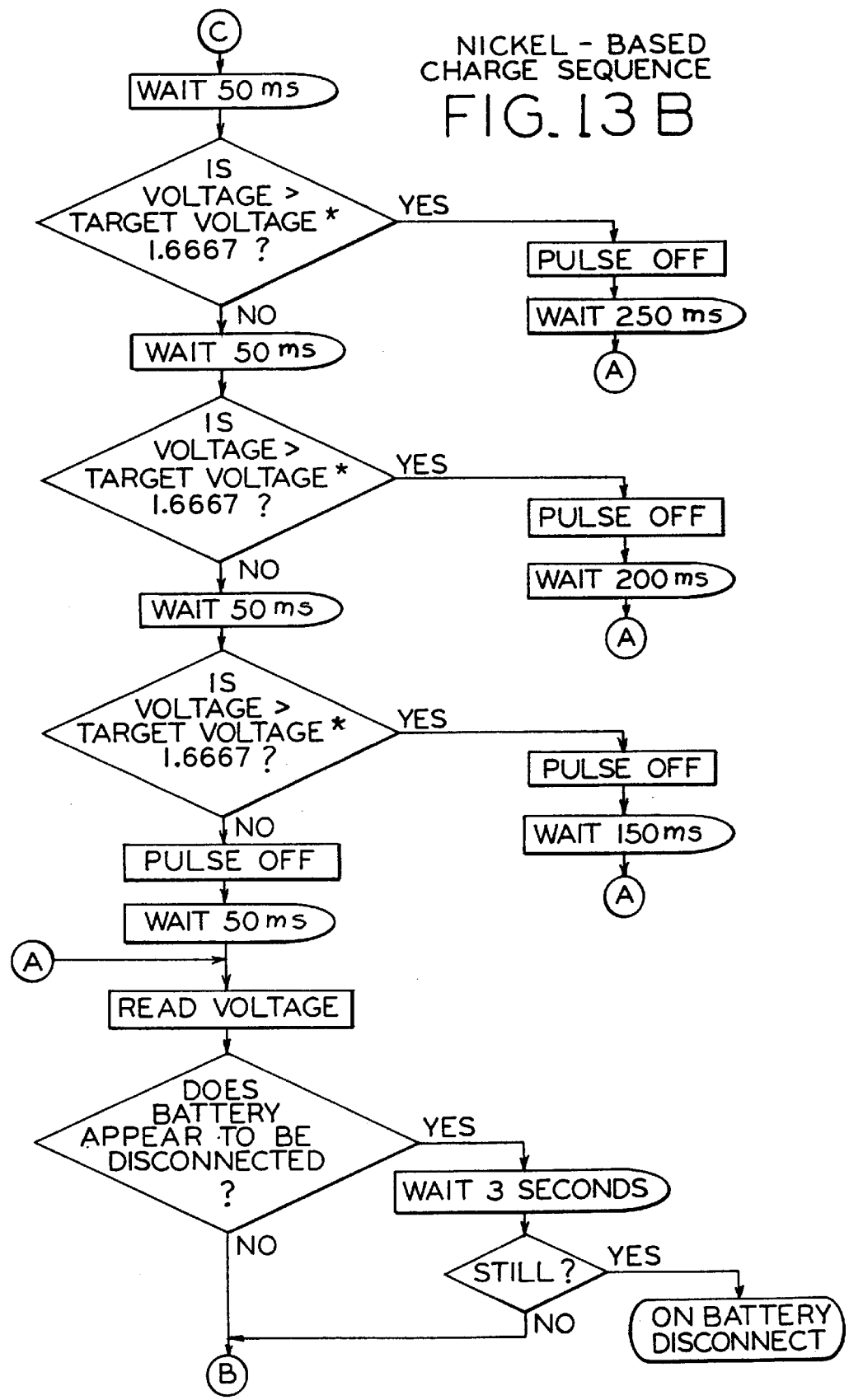

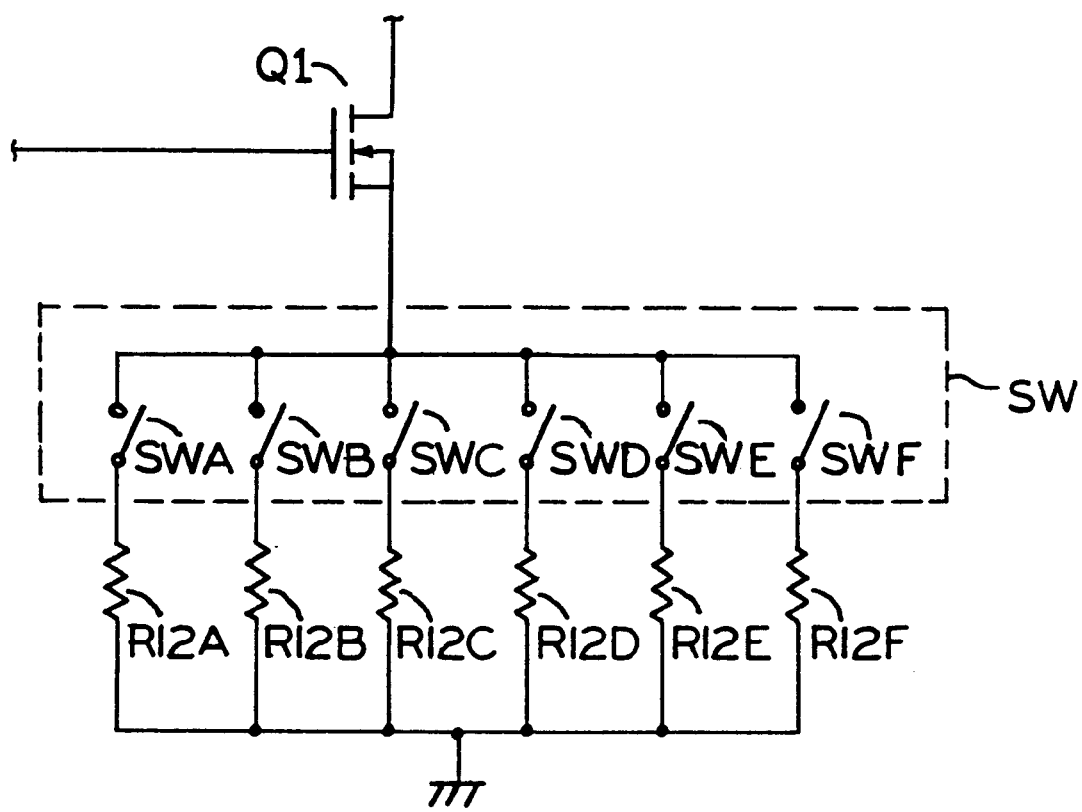
FIG_14

METHOD AND APPARATUS FOR RAPIDLY CHARGING AND RECONDITIONING A BATTERY

CROSS REFERENCE TO RELATED APPLICATIONS

This application claims the benefit under Title 35, U.S.C. § 119(e) of U.S. Provisional Patent Application Ser. No. 60/034,921, entitled IMPROVED METHOD AND APPARATUS FOR RAPIDLY CHARGING AND RECONDITIONING A BATTERY, filed on Jan. 7, 1997.

BACKGROUND OF THE INVENTION

The invention relates generally to devices for charging, formatting, and reconditioning batteries. More particularly, the invention relates to methods and devices for rapidly charging and/or reconditioning a battery that provide particular staging sequences that primarily consist of charge pulses, discharge pulses, such as by applying a load across the battery, and wait or rest periods. Batteries are commonly used to provide a direct-current (dc) source of electrical energy in a wide variety of applications. A battery generally consists of a plurality of cells grouped together in a common container and electrically connected to provide a particular dc source. For example, four 1.5 volt cells rated at 1 ampere (amp) may be series connected to provide a 6 volt dc source rated at 1 amp. Cells may also be connected in parallel, e.g., four 1.5 volt cells rated at 1 amp connected in parallel provide a 1.5 volt dc source rated at 4 amps, or in a combined series-parallel fashion. The cell consists of two electrodes, one connected to a positive terminal and the other connected to a negative terminal, which serve as conductors through which current enters and leaves the battery. The electrodes or plates are surrounded by an electrolyte that acts upon the electrodes in a manner dependent upon the nature of the materials used to comprise the battery.

A battery may be a primary or a secondary cell type. The present invention is essentially concerned only with secondary cell type batteries, which may be recharged by forcing an electrical current through the battery in a direction opposite to that of discharge. Batteries store current, the storage capacity of a battery is generally rated according to ampere-hour capacity, e.g. a battery that delivers an average of 10 amps without interruption over a 2 hour period, at the end of which time the battery is completely discharged upon reaching a low voltage limit, has a capacity rating of 20 (10×2) amp-hours. If discharged at a faster rate, e.g. over one hour instead of two, the battery will deliver less than the rated capacity.

Battery charging is, in its simplest terms, accomplished through delivery of a current to a battery, thereby ionizing the plates to opposing potentials (voltages or electrical pressures). With a linear charger, this is achieved through the use of a marginally higher charger voltage vs. what the battery's maximum rest voltage is. Usually, in the most rudimentary charger types, minimal consideration is given to regulation, whether it be current or voltage. The battery is simply allowed to drift up to its maximum potential. This is useable, albeit slow, and also does not treat the battery equally over time. When the battery is lowest, the most amount of current flows. If you were to divide the time that it takes for the battery to charge by five, the first time segment would appear to have charged the battery by about 70%, the next segment would be up to 90%. The remaining three time segments gradually approach the 100%.

When charging a battery, it is preferred to use a charge voltage that is only marginally higher than the full battery potential. This is because any voltage above that will be leaked across the electrolyte of the battery and not stored. Energy not stored, having nowhere else to go, is converted to heat. Roughly, this would be $(E_c-E_R) \times I_c = P_w$ where $E_c$ is the charging voltage, $E_R$ is the battery resting voltage, $I_c$ is the charging current, in amperes, and $P_w$ is the power wasted in watts. This $P_w$ is converted to heat since it cannot be absorbed by the battery. More advanced chargers use a pulsing technique to send bursts of energy to the battery at higher voltages. While this does get the job done quicker, the effects are to gradually destroy the battery by heating, and eventually evaporating, the electrolyte inside.

An alternative path is to use a constant current source, assuming that the battery is capable of accepting a set amount of current at any time. These chargers regulate current by automatically adjusting the voltage so a predetermined amount of current is delivered. Volume of current is the design factor, not the voltage of the battery. Unfortunately, the results here can be less than desirable. If the amount acceptable to the battery is overestimated, the battery becomes less willing to accept the current. The charger instantly compensates by raising the charge voltage. The battery heats up, which further exacerbates the situation by causing the battery to become even less able to accept further charging. The cycle continues. Without limits, this scenario could escalate to destruction of the battery.

During the charging process, ionization of the plates, negative ions to the positive plate and positive ions to the negative plate, occurs which impedes the further transfer of ions to the plates and therefore further charging of the battery. The battery develops increased resistance, in the form of impedance, to charging as the battery's charge increases. Recent battery charging techniques attempt to more rapidly charge a battery by applying discharge pulses intermittently between charging pulses to depolarize the plates of the battery. The discharge pulse intermittently removes ions from the plates, thereby permitting the flow of additional ions which will then transfer additional charge to the plates upon subsequent charge pulses.

During a given charge pulse, the voltage of the battery will be at its greatest at the end of the charge pulse. Battery chargers of the prior art apply the discharge pulse after the charge pulse to depolarize the battery while at its highest voltage level to prepare the battery for the subsequent charge pulse. One such prior art charger is disclosed in U.S. Pat. No. 4,829,225 (Podrazhansky) and calls for the discharge pulse to immediately follow the charge pulse. Wait or rest periods are applied intermediate the charge and discharge pulses to stabilize the battery during charging, this is especially important in charging applications for nickel-based batteries. The durations of the charge, discharge, and wait periods are generally in the order of tenths of seconds to a few seconds. The load across the battery generally takes the form of a depolarization pulse, the current level of which is of the same magnitude or greater than the current level of the charging pulse. Generally, the charging pulse is of substantially longer duration than that of the load or depolarization pulse. Generally, the duration of the rest period, or stabilization period, is greater than the duration associated with the load or depolarizing pulse.

The magnitude of the charge or load, the duration of the charge, load, and rest stages, and the particular sequencing of the three stages is dependent upon the particular battery type being charged or reconditioned Further, the sequencing, magnitude, and duration of these stages may be varied during the process of charging or reconditioning the battery. Generally, the batteries are measured while under load to determine the level of charge as this tends to give a more accurate measurement of the battery that would otherwise be colored by the battery's impedance and the charge delivered.

Conventional battery chargers merely deliver steady voltages and slowly ionize the plates in the battery. A problem with this is that the battery cannot absorb all of the energy delivered and the charging process takes an excessive amount of time to complete. Part of the reason is that the charger is forced to deliver a certain voltage level, just above the normal capacity, and the static resistance of the battery makes it so that a certain amount of current is delivered. Initially, the amount of such current is often too much for an ongoing charge. In addition, at various points during the charging process, the resistance of the battery changes, further complicating efficient battery charging. Whenever there is more power being delivered to the battery than it can absorb, the excess is spent by converting it to heat.

Some modern pulse chargers disclose the use of load, charge, and wait/rest periods during charging. Although such pulse chargers do "shock" a charge into a battery, the amount of positive-going rail-to-rail voltage measured across the battery is not very significant. If the bakery were discharged by a load just before it received a charging pulse, the positive-going rail-to-rail voltage would be increased, thereby "shocking" the battery even harder. Because pulse chargers use non-linear power delivery, static battery resistance cannot be a factor. However, battery impedance is a factor and is affected by the frequency and duty cycle associated with the pulse charges.

One problem associated with prior art battery chargers, such as so-called wall-wart type chargers, concerns the amount of time required to fully charge a battery. Such known chargers generally require a period of 12–24 hours of continuous charging to fully charge a typical battery. This results in undesirable, extended down-times for devices being served by the battery being charged or the expense of purchasing and maintaining multiple batteries.

Another problem associated with the prior art is that batteries charged by prior art chargers typically suffer the undesirable effect of steadily decreasing charge capacity, or memory, the so-called "memory effect." As the battery is charged over numerous occasions, its charge capacity gradually decreases. The memory effect relates to a permanent increase in the impedance of the battery resulting in increased resistance to charging. Eventually the battery cannot maintain any appreciable charge and must be discarded or reconditioned.

SUMMARY OF THE INVENTION

The present invention provides an improved battery charger and reconditioner which employs an improved charging sequence that actively modifies the impedance of the battery during the charging process to enhance the current receiving properties of the battery. The charger of the present invention delivers just the amount of power and current as the battery can absorb so as to avoid inefficient overheating, more rapidly charge the battery, and enhance the level of charge associated with the battery being charged, while reversing or at least avoiding the negative effects of memory, i.e., permanently increased impedance. The battery charger of the present invention preferably utilizes a constant current power supply so as to provide a stable flow of current and avoid spikes associated with a standard residential AC power supply.

According to Ohm's law, E=IR, which means that E, the voltage (volts), equals I, the current (amperes), times R, the resistance (ohms). If we use a constant current supply, we know what the current is. The supply makes the voltage such that the required current is delivered. With a little algebra we can calculate the resistance of the battery. Actually, since we are talking about a fluctuating voltage because of the pulsing technique, a different term is used instead of resistance. Impedance, denoted by the letter Z instead of R, is functionally equivalent and the formula is the equivalent (E=IZ).

An important aspect of the present invention is that the lowering of the impedance of the battery permits a lower voltage to be used to deliver the same amount of current to the battery. In charging, a short quick discharge pulse, just prior to the charge pulse reduces the battery's impedance allowing a lower charge pulse voltage to deliver the same amount of current. When batteries are being charged, they will hold two levels of voltage. One is the designed potential. The other is sort of a capacitor-like side-effect that has a higher voltage, but with almost no real current behind it. Some calculation, but mostly experimentation, can determine how strong a discharge pulse (or how big a load) to connect and for how long to best drain this false potential which artificially inflates the battery impedance. The heavier the load, the lower the impedance becomes, however there are limits; mainly the ability of the battery to deliver without damage. The longer the load is applied, the lower the impedance becomes, but in this case there comes a point of diminishing returns. Immediately follow this discharge pulse with a constant current pulse, and charging can actually exceed, by a small percentage, the theoretical limits. How much current is primarily going to be determined by the maximum charge rate, or C. For nickel-based batteries, the maximum charge rate is about 4C, which means the charge time should be about 15 minutes at 4 times the battery's rated current. The optimum length of the charge pulse depends on how effective the discharge pulse is in lowering the impedance of the battery. Basically, the duration of the charge pulse is however long it takes for the battery's impedance to ramp up to a point where an excessive amount of energy is wasted. In practice, these optimum numbers are seeded with a good guess, and then perfected with experimentation.

It would be possible to use measured voltage to automatically stop the discharge pulse and the charge pulse at the optimum time. Unfortunately, this hampers the ability of the charger to detect the capacity of the battery for determining, most importantly, when to end the charge. It might, however, be possible to use the timing aspects of the charge pulse, in this configuration, to determine when the end of the charge should occur. For example, when the charge pulse becomes inordinately short, and/or the discharge pulse becomes abnormally long, it could be guessed that the charge was complete. Another disadvantage to this, however, is that this, to some extent, restricts the amp-hour flexibility that chargers without this scheme enjoy. Without this method, the charger need only be concerned with the voltage rating of the battery. With it, the ability to charge most batteries of the same voltage, but different amp-hour ratings, will be lost.

A major breakthrough in charging technology was the idea of "pulse" charging. This involves switching the charging current on and off at specific time intervals to deliver higher energies faster into the battery. As discussed above, the prior art suggests that it is desirable to place a stabilizing wait period after each discharge pulse and to apply the discharge pulse after the charge pulse. In contrast, the battery charger of the present invention applies a discharge pulse substantially immediately prior to delivering a charging pulse, preferably without an intermediate wait period, thereby lowering the impedance and the voltage of the battery so that the charger may deliver the desired amount of current, preferably in the form of a constant current supply, at the lowest possible voltage. The greater the impedance of the battery, the greater the charge voltage must be to deliver a fixed amount of current. Basically, the idea is that a battery will only hold a specific amount of voltage. In order to best supply the current, the voltage charging it needs to be low. When the battery voltage is high, the current added is just ramping the battery's voltage up even higher causing it to "break over". The result is that most of the energy is not stored, but converted to heat. Lowering the battery voltage before pulsing it causes the battery to store the applied energy essentially eliminating the possibility of break over.

The present invention, in one form, utilizes a microprocessor having at least two digital output pins to control the current source and the load source and at least one A/D port for reading the battery voltage. Timing is another factor in successful battery charger design. The present invention uses two different timing algorithms. One is a "wait" design that spends time by looping a calculated number of times. Since we use a crystal to control the oscillator to the microprocessor, the timing in this wait routine is very accurate. We can specify wait times to increments of 20 microseconds. Another type of wait routine is a background task time-out routine. An interrupt driven "tick" decrements a time-out variable. This provides the ability to specify time-out in increments of 16,384 microseconds. This is used to regulate overall charge time-out variables. The A/D port "sees" the voltage on the battery. It is scaled on a 11:1 ratio. The maximum voltage the A/D port can handle is 5V in increments of 1.95 mV. Scaled, this equates to 55V in increments of 21 mV. This is sufficiently accurate and gives us a good range to charge most types of batteries. The A/D port can watch voltage during rest, load and pulse. Battery removal detection is accomplished by the fact that the constant current source will try to deliver a specific current into an infinite impedance, ergo, the voltage goes to the limit of the supply. When the microprocessor sees a ridiculously high voltage, it knows that the battery has been disconnected.

Optimum charging characteristics depend on the type of battery being charged. Different types of batteries have differing abilities to reach full charge, show level of charge, and accept charge. Lead-based batteries are relatively easy to charge and can be charged up to, and slightly beyond, a 1C rate. Lead-based batteries are stable in break over conditions, can be measured at rest for level, and are predictable for maximum voltage. Our lead-acid algorithm uses a "charge profile" comprising a 2 ms discharge pulse followed by a 100 ms charge pulse. We repeat this profile with almost no wait time between pulses until either the "mid" voltage is reached or a zero-delta-V is reached or a time-out occurs. The mid charge then runs with 4 sets of charge/discharge pulses, with a 25 ms cycle wait time, until a zero-delta-V is reached on both loaded and rest voltage. The "end" charge just runs for two minutes with a 100 ms wait time between each charge/discharge pulse. Optionally, a trickle charge may be added for whatever amount of time with 500 ms wait time between charge/discharge pulses.

Nickel-based batteries are somewhat trickier to charge but can be charged at up to a 4C rate. These batteries become voltage unstable on break over, give no meaningful value as a rest voltage, and degrade in maximum voltage potential over time. The basic "charge profile" comprises a 6 ms load, 300 ms charge(max), and 50 ms rest. The charger includes the ability to detect break over and an improved charge level detect. The first step in charging these types of batters is to predict what the longest amount of time to charge should be. This is done by loading the battery for 200 ms and reading its voltage. This gives a rough guess as to how long it should take. The battery is then charged until either the target voltage is reached, or a time-out occurs. The charge profile has some code in it to prevent break over conditions and recover from them if they do occur. While the discharge pulse is being delivered, the battery's voltage is read. While the charge pulse is being delivered, if the voltage reached a level that we know is close to break over, the pulse is stopped. To speed recovery, a discharge pulse inversely proportional to the time it took to reach near break over is used. If break over occurs, a discharge pulse will not help recovery, in fact, quite the opposite. A 3 second pause is used to allow the break over to pass. Break over makes battery removal detection somewhat tricky since a battery in break over acts like it has been disconnected.

Lead-based formation is quite different in that the initial state of the battery is exactly known and the amount of time to format is quite predictable. The charger of the present invention uses the standard profile (2/100) with a 1 ms rest for about 1½ hours. The rest time is then put to 50 ms and the formation continues for another 12½ hours for a total of 14 hours. There is no need to read the battery voltage other than for the purposes of status monitoring/data collection and removal detection.

The 50:1 ratio of charge vs. discharge time common to both lead-based and nickel-based batteries is partly dependent on the type of load used, so it could vary quite a bit, depending on the load. Optimum loading is however much the battery can stand. Longer load times can allow for longer pulse times, but there comes a point of diminishing returns where not enough extra charge time is gained by a longer discharge time. The goal is to get the largest ratio between charge and discharge times. The charger of the present invention provides in one form a 50:1 ratio. This appears to be an optimum relationship which results in the least amount of wasted energy.

In one form, the battery charger of the present invention utilizes a standard charge profile comprising a 2 millisecond duration load or discharge pulse, a 100 millisecond duration charge pulse and a variable duration rest or wait stage. The discharge pulse is characterized by a discharge rate greater in magnitude than that of the charge pulse, typically in the range of 2 to 5 times the rate of the charge pulse. However, it should be understood that these parameters may vary in accordance with the type of battery being charged. These three basic elements, discharge, charge and rest, may be grouped together in a variety of sequence configurations to effect a complete charging process. The particular charge profile, that is, the particular sequencing of the three charge elements, may depend upon the state of charge in the battery at any given point in time. Multiple charge profiles may be combined to charge a battery over a range of conditions, but the primary charging sequence is as described above. The level of charge of a battery is monitored throughout the charging process and as the level of charge changes, a corresponding change in the charging sequence may occur.

The process of adding current to a battery is somewhat analogous to adding water to a pool by use of a hose, the greater the rate of water, the greater the waves formed in the pool. The waves of the pool are analogous to the destabilizing action of the battery during the charging process, as the pool becomes substantially full the waves begin to spill water over the sides of the pool. By intermittently stopping the flow of water into the pool, the water level is permitted to stabilize causing less spillage. As the battery nears a full charge, the battery's resistance to accepting a charge goes up and power is wasted in the form of heat, this results in inefficiencies and potential damage to the battery. The rest or wait period allows the battery to at least partially stabilize.

The relationship between the durations and magnitudes of the charge and discharge pulses, for example 2 milliseconds and 100 milliseconds respectively, is critical to attaining the modified lower battery impedance necessary to charge the battery in the most effective and efficient manner. The primary or standard charge profile of FIG. 3A, associated with lead-based battery chargers, is 2 milliseconds (ms) of load time, 100 ms of charge time, followed by 1 ms of rest time. This profile is essentially repeated throughout the battery charging process. The profile of FIG. 3B illustrates a typical "trickle" charge sequence in which a greater rest time is provided to more fully stabilize the battery being charged at the latter portion of the charging process when battery stabilization is a greater concern. Variations to the standard charge profile may be utilized to more effectively and rapidly charge a battery from a fully discharged state through a fully charged state.

The standard charge profile associated with nickel-based battery charges is illustrated in FIG. 5 having a 6 ms discharge pulse followed immediately by a 200 ms charge pulse which is followed by a 50 ms rest period. As the battery approaches a full charge, the charge pulse may be shortened and the rest period may be lengthened for greater stabilization.

While charging a battery, a battery stores a charge in two ways. One way is through the designed way where the plates hold ions either positive or negative on either side. But there is a second way caused by the natural effect of having two plates of metal next to each other, they naturally act with a slight degree of capacitance. This is very minimal but when you are charging the battery, you will load that capacitance up and it naturally sort of increases the impedance of the battery. This is not as critical when using a linear charging device. However, when charging a battery with a non-linear charging system as by pulsing the battery, then it is much more significant a factor. The discharge pulse removes that natural capacitance and thereby further lowers the impedance of the battery and allows a lower charging voltage to be used. The closer the discharge pulse precedes the charge pulse the better, because any wait period between the discharge pulse and the charge pulse allows the battery to naturally recharge. This intermediate recharging raises the voltage, the capacitance, and the impedance of the battery and requires a greater charging voltage to be used to move the desired fixed amount of current.

The present battery charger is preferably a microprocessor-driven circuit utilizing firmware and associated interface components to sense the charge of the battery, typically in terms of voltage, and to implement the sequencing of the charge profiles. An advantage of the present invention is associated with the preferred use of a constant current switching power supply to remove the adverse effects of spikes associated with a conventional AC power supply. Another advantage of the present invention battery charger is the relationship between the magnitudes and the durations associated with the charging, loading, and resting steps to most effectively and rapidly charge a battery.

In one embodiment, the present invention provides a process for rapidly charging a battery by a battery charger having an input connected to a source of power, the battery charger providing alternating charge and discharge pulses to the battery. The charging process comprises the steps of; a) partially discharging the battery substantially immediately prior to a charging pulse to lower the impedance and the voltage of the battery prior to the charge pulse being delivered to the battery; b) substantially immediately after partially discharging the battery, supplying the charge pulse to the battery, the charge delivered to the battery during the charge pulse being greater than the charge drained from the battery during the discharge pulse; c) waiting a rest period after the charge pulse of step b) and prior to applying a subsequent discharge pulse to the battery to allow the battery to at least partially stabilize; and d) repeating the above steps.

In another embodiment, the present invention provides an apparatus for rapidly charging a battery. The charging apparatus includes an output adapted to be electrically connected to a battery. The charging apparatus further includes a charge pulse generator adapted to provide a charge pulse at the output; a discharge device adapted to provide a discharge pulse at the output to drain current from the battery and to lower the impedance of the battery; and a control device alternatingly connecting the discharge device and the charge current generator to the output so as to alternatingly provide the charge and discharge pulses and an electrically neutral rest period, respectively, to the battery. The discharge, charge, and rest periods are applied to the battery in a predetermined standard charging sequence in which the discharge pulse is applied substantially immediately prior to the charge pulse.

In yet another embodiment, the present invention provides a method of formatting a battery by a battery charger having an input connected to a source of power, the battery charger adapted to provide alternating charge and discharge pulses to the battery. The formation method comprising the steps of providing a first formation sequence and a second formation sequence of charge and discharge pulses and an electrically neutral rest period. The first formation sequence comprises the steps of a) applying a first charge pulse to the battery; b) resting a first wait period to allow the battery to at least partially stabilize; c) measuring the charge of the battery and repeating steps a) and b) until detecting a first charge threshold value, upon detecting the first charge threshold value, transitioning the battery charger from the first formation sequence to the second formation sequence. The second formation sequence comprises the steps of d) partially discharging the battery substantially immediately prior to applying a charge pulse to reduce the impedance of the battery; e) substantially immediately after discharging the battery, applying the charge pulse to the battery; f) resting a second wait period prior to applying a subsequent discharge pulse to the battery; and g) repeating steps d) through f) until the battery reaches a second threshold.

In yet other embodiments, the present invention provides the following: 1) a process for reconditioning a battery suffering from decreased charge capacity due to the effects of memory; 2) an apparatus for rapidly charging a plurality of battery types having different rated voltages and different rated charge capacities; 3) a process for removing dendritic formations formed on a rechargeable battery to restore lost charging capacity of the battery; 4) a method for aborting a battery charging process; and 5) a method of shocking a battery from an abnormal condition to a normal charging condition during a charging process.

One advantage associated with the present invention is that it provides a rapid battery charger that can bring a battery to full charge within a greatly reduced period of time as compared to battery chargers of the prior art. Specifically, the charger of the present invention lowers the impedance of the battery being charged just prior to the charging pulse to thereby enhance the current receiving properties of the battery so that the battery will be able to receive a greater amount of current at a reduced voltage level to thereby reduce or eliminate heat generation and permit the battery to be charged at a much more rapid rate without adversely affecting the condition of the battery. Where a prior art charger may have taken 12-24 hours to completely charge a battery, by example, the present charger may take as little as 45 minutes to one hour. By utilizing faster switching semiconductor components as opposed to Darlington transistors to effect the charging sequences, efficiency is improved, specifically less heat generation during operation.

Another advantage of the present battery charger is that batteries charged by it are not subject to the ill effects of memory and will maintain their full charge capacity even after repeated charges. The present battery charger effectively reconditions the battery as it is being charged and greatly increases the life of the battery. The battery charger of the present invention may be configured for use with a wide variety of battery sizes and types, such as lead, nickel, including nickel cadmium (Ni—Cad), nickel metal hydride (Ni—MH), and, zinc-nickel and cadmium, including silver-cadmium and cadmium-air, based batteries as well as zinc, lithium, etc.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a diagram of an electronic circuit illustrating one embodiment of the hardware associated with the battery charger of the present invention.

FIG. 2B is a flow chart illustrating one charging process for lead-based battery charger firmware associated with the battery charger circuit of FIG. 1.

FIG. 3A is the charge profile timing chart illustrating the standard charging sequence for lead-based battery chargers utilizing the circuit of FIG. 1.

FIG. 3B is the charge profile timing chart illustrating the trickle charging sequence for lead-based battery chargers utilizing the circuit of FIG. 1.

FIG. 4A is a flow chart illustrating the charge initialization process for nickel-based battery charger firmware associated with the battery charger circuit of FIG. 1.

FIG. 4B is a flow chart illustrating the charging sequence for nickel-based battery charger firmware associated with the battery charger circuit of FIG. 1.

FIG. 5 is a charge cycle timing diagram depicting the charge profile of a nickel-based battery charger utilizing the charging circuit of FIG. 1.

FIG. 6 is a functional block diagram of the battery charger of the present invention.

FIG. 7A is a timing chart depicting the first stage of the formation charge profile of the battery charger of the present invention.

FIG. 7B is a timing chart depicting the second stage of the formation charge profile of the battery charger of the present invention.

FIG. 8 is a flow chart illustrating the formation charge profile of the battery charger of FIG. 1.

FIG. 9 is a flow chart illustrating the primary charger control sequence associated with the battery charger hardware of FIG. 1.

FIG. 10 is a flow chart illustrating the continuous interrupt counter sub-routine associated with the primary charger control sequence of FIG. 9.

FIG. 11 is a flow chart illustrating the charger trickle sequence associated with the primary charger control sequence of FIG. 9.

FIG. 12 is a flow chart illustrating the lead-based battery charging sequence associated with the primary charger control sequence of FIG. 9.

FIG. 13B is a flow chart illustrating the remainder of the nickel-based battery charging sequence associated with the primary charger control sequence of FIG. 9.

FIG. 14 is a schematic diagram of an alternative selectable load discharge device for use in the battery charger circuit of FIG. 1.

Figure 2A:
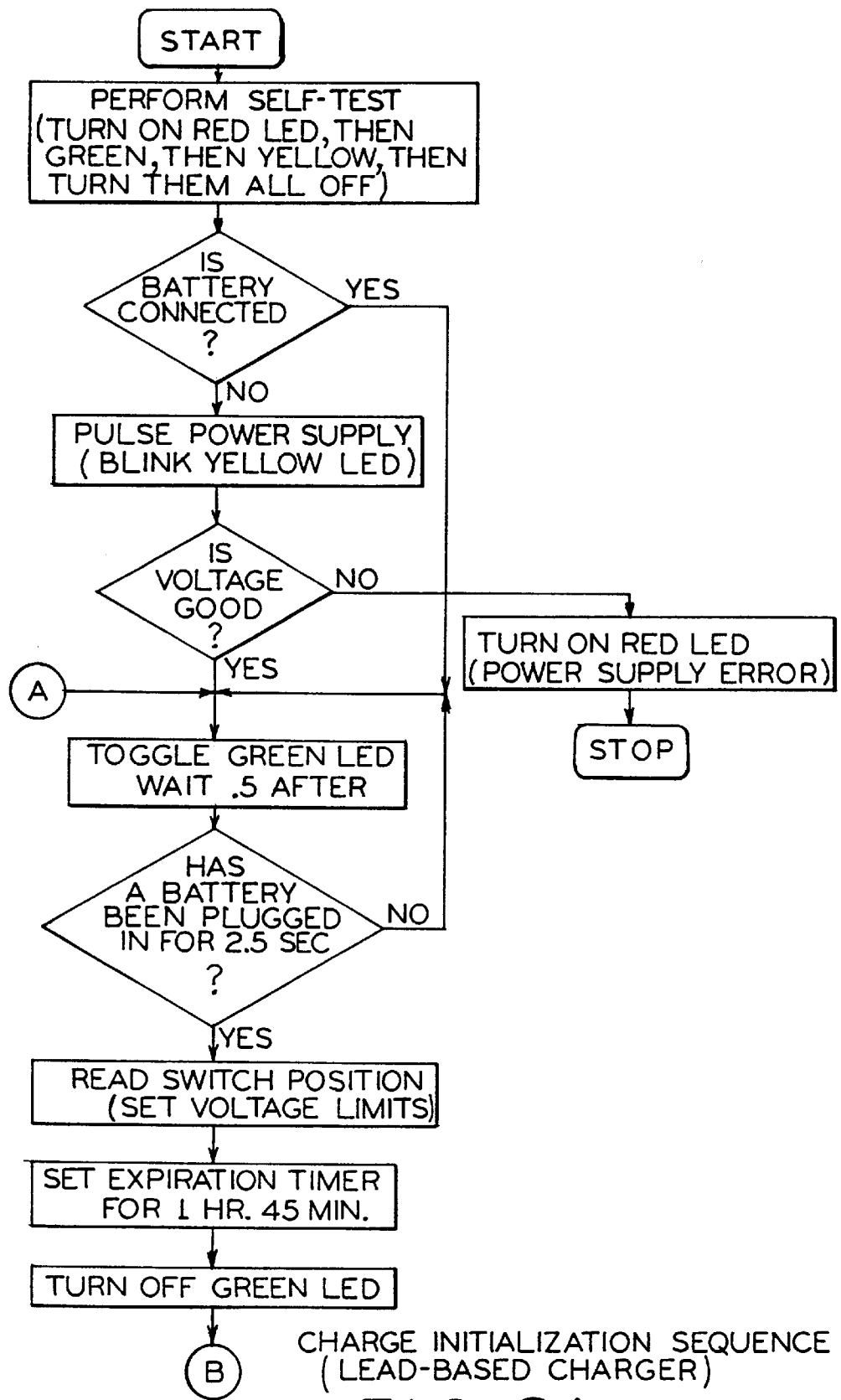
FIG. 2A is a flow chart illustrating the charge initialization process for lead-based battery charger firmware associated with the battery charger circuit of FIG. 1.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DETAILED DESCRIPTION OF THE INVENTION

Referring now to the drawings and particularly to FIGS. 1 and 6, the hardware associated with the battery charger of the present invention, generally designated at 10, is powered such as by conventional residential AC power source 12, which may have a value of between 90 and 132 volt RMS. AC source 12 is connected to front end power input circuitry 13, which supplies power to the constant current regulated power supply, generally designated at 14. Constant current power supply 14 converts AC power source 12 into a direct current power supply for delivering a constant current power source to battery 16 via transformer 18 and associated circuitry 20. Power source 12 is also connected to constant voltage source 24, which has a 6.2 voltage regulator section and a 5 volt regulator section that supply a 6.2 volt and a 5 volt supply voltage, respectively, to the logic associated with charger 10. The logic components associated with charger 10 are found in charger control 15 and pulse width modulation (PWM) current regulator 17. Charger control 15 provides on/off control of constant current power supply 14, PWM current regulator 17, and switchable load 19.

Constant current power supply 14 is digitally switched by PWM current regulator 17 to provide a predetermined fixed current to battery 16. PWM current regulator 17 includes bridge rectifier BD1 that converts the AC power source to a DC source connected to the primary side of transformer 18. Battery 16 receives a constant current supply from the secondary of transformer 18. The primary side of transformer 18 is connected to pulse switching MOSFET Q1 and resistor 12 of PWM current regulator 17, which controls the amount of current fed to battery 16 through transformer 18.

The gate of switching transistor Q1 is connected to an output of current mode controller U1, which generates a control signal at the output to effectively switch transistor Q1 at an appropriate speed and duty cycle to provide the desired constant current to battery 16. PWM current regulator 17 is ultimately controlled by microprocessor U3, such as Microchip model PIC16C71, which has outputs drivingly connected to opto-isolators U4, pulse control, and U5, power supply control. Two separate power supplies, constant current supply 14 and voltage source 24, are provided on separate ground planes to minimize noise. Opto-isolators U4 and U5 are used to communicate command signals and information between the separate logic components. Although it is possible to tie the two separate ground planes together, isolation is preferred. Opto-isolators U4 and U5 are connected to inputs of current mode controller U1. During charge pulses, microprocessor U3, via current mode controller U1, rapidly switches transistor Q1 to permit current to travel from the direct current output of bridge rectifier BD1, through the primary side of transformer 18, through the drain and source leads of transistor Q1, and through resistor R12 to ground.

Constant current power supply 14 includes switchable load source 19 having load switching MOSFET transistor Q3 and load resistor R21. The gate of transistor Q3 receives an excitation signal from charger control 15 via an output of microprocessor U3. Switchable load source 19 is disposed intermediate the positive or non-grounded side of battery 16 and ground. During discharge pulses, current is drained from battery 16 through the drain and source leads of transistor Q3, and through resistor R21 to ground. A MOSFET transistor is preferred because of the very fast switching speed and because there is little resistance from source to drain, accordingly, essentially all power is dissipated by resistor R21. In this manner the impedance and voltage of battery 16 is reduced during the charging process to enhance the current receiving properties of the battery. The constant current supply can thereby feed the desired amount of current to the battery at a reduced voltage level. Although a MOSFET and load resistor are described as providing the means for discharging the battery, it should be understood that other acceptable devices, such as relays, Darlington transistors, etc. are fully contemplated by the present invention.

A relatively large amount of power is transferred across the load. The resistor 21 is very effective at dissipating heat, it in effect acts as a heat sink for MOSFET Q3. Optimally, the load circuitry should draw as much current as possible for the briefest possible time up to the upper limit of the battery so as not to damage the battery. The value of resistor R21 determines the rate of discharge. For example, a 24 volt battery discharged across a 1 ohm resistor would result in a current draw of 24 amps. Assuming the battery is lead-based and has a capacity rated at 10 amp-hours, a draw of 24 amps would be 2.4 times the battery's rating. Generally, for lead-based batteries a current draw of up to 5–6 times the rated capacity is acceptable without damaging the battery. With lead-based batteries, the charger charges at a rate of approximately 1C, where C is the rated capacity of the battery. Accordingly, the discharge circuit discharges at approximately 5–6 times the charge rate. In the case of nickel-based batteries, the charger charges at up to about 4C, and the discharge circuitry discharges at approximately twice the charge rate. For example, a nickel-based battery rated at 24 volts and 1200 mamp-hour could be charged with a 5 amp charger at approximately 4 times the rated capacity of the battery. If R21 is 1 ohm, the battery is discharged at 24 amps, 20 times the rated capacity of the battery. Discharge at such a high rate would cause damage to the battery. If R21 is 4 ohms the battery is discharged at (24÷4) 6 amps, 5 times the rated capacity of the battery, this is acceptable.

PWM feedback is provided by current shunt resistor R22, which provides a feedback signal representative of the amount of current flowing through the battery. This feedback signal is fed to an input of operational amplifier (op-amp) U2, which decides whether PWM current regulator needs to conduct more or less current through constant current power supply 14 to battery 16. Op-amp U2-2 functions as an amplifier and U2-3 functions as a comparator. The ouput of U2-3 is connected to component LED1 of opto-isolator U4. Current mode controller U1 varies the duty cycle of Q1 in accordance with the signal generated by LED1 and input to the current mode controller via TPD1. AC transients resulting from the PWM switching of the constant current power supply are effectively removed by bypass stabilizing capacitor C20. The capacitor permits the AC transients to bypass around resistor 22 to ground, resulting in a more accurate dc current reading at the shunt resistor. By way of example and not limitation, a table of values associated with the circuit of FIG. 1 is provided below.

TABLE OF VALUES

Resistors

| R1  | 1M ½ W    | R19 | 3K       | R35 | 2K   |
|-----|-----------|-----|----------|-----|------|
| R2  | 330K ½ W  | R20 | 10K      | R36 | 2.2K |
| R3  | 6.2K 5 W  | R21 | 10Ω 7 W  | R37 | 10K  |
| R4  | 200Ω 5 W  | R22 | 0.1/7 W  | R38 | 220Ω |
| R5  | 2.2K      | R23 | 470Ω     | R39 | 10K  |
| R6  | 10K       | R24 | 1K       | R40 | 1K   |
| R7  | 9.1K      | R25 | 1K       | R41 | 39K  |
| R8  | 9.1K      | R26 | 24K      | R42 | 470Ω |
| R9  | 47Ω       | R27 | 220Ω     | R43 | 1K   |
| R10 | 1K        | R28 | 470Ω     | R48 | 470Ω |
| R11 | 1K        | R29 | 100K     | R49 | 470Ω |
| R12 | 0.33Ω 2 W | R30 | 4.7K     | R50 | 470Ω |
| R13 | 1K        | R31 | 1K       | R51 | 2.4K |
| R14 | 1K        | R32 | 10K      | R52 | 2.4K |
| R17 | 470Ω      | R33 | 10K      |     |      |
| R18 | 10K       | R34 | 2K       |     |      |

Capacitors

| C1  | 220 μF 200 V   | C13 | 100 μF 25 V  | C26 | 0.22 μF        |
| --- | -------------- | --- | ------------ | --- | -------------- |
| C2  | 103 pF/1K V    | C15 | 100 μF 25 V  | C27 | 47 μF          |
| C3  | 1000 μF 25 V   | C17 | 1000 μF 50 V | C28 | 820 pF         |
| C4  | 100 μF 16 V    | C18 | 1000 μF 50 V | C29 | 330 μF 16 V    |
| C5  | 4.7 μF 50 V    | C20 | 0.22 μF 50 V | CX1 | 0.22μF 250 V   |
| C6  | 103 μF 50 V    | C21 | 0.22 μF      | CX2 | 0.22μF 250 V   |
| C7  | 103 μF 50 V    | C22 | 0.1 μF       | CY1 | 4700 μF 400 V  |
| C8  | 102 μF 50 V    | C23 | 0.1 μF       | CY2 | 4700 μF 400 V  |
| C9  | 561 μF 100 V   | C24 | 18 μF        |     |                |
| C10 | 330 μF 16 V    | C25 | 18 μF        |     |                |

Diodes

| D1 | 1N4001 | D5 | 1N4001   | D103 | Yellow         |
|----|--------|----|----------|------|----------------|
| D2 | 1N4001 | D6 | HER1603C | D104 | Green          |
| D3 | BYV26D | D7 | MBR1645  | D105 | Red            |
| D4 | 1N4001 | D9 | 1N4001   | BD1  | RC206 2A/800 V |

TABLE OF VALUES

Transistors

| Q1 | IRFP450 | Q4 | 2N3906 | Q7 | 2N4401 |
|---|---|---|---|---|---|
| Q2 | 2N2907 | Q5 | 2N4401 | | |
| Q3 | MTP30NO6EL | Q6 | 2N4401 | | |

Miscellaneous

| U1 | UC3844N (AN) | U6 | 78L05 | NTC1 | SCK054 5Ω 4A |
|---|---|---|---|---|---|
| U2(1–4) | LM324 | U7 | 78L12 | ZD1 | 1N4746A 18 V 1 W |
| U3 | P1C16C71 | X1 | 4 MHz | ZD2 | 6.8 V 1/2 W |
| U4 | 4N35 | L1 | 8µH | ZNR1 | 241KD07 |
| U5 | (1/2)4N35 | FS1 | 1.5 A/125 V | VCCI-6 | +5 volts |
| VCC2 | +6.2 volts | | | | |

With respect to the particular components of FIG. 1, it should be understood that transformer winding ratios and other discrete element values may be adjusted in accordance with the particular application at hand. Examples of possible applications include: a circuit for use in a 13 amp application, 10 amp application, 5 amp application, and 2.5 amp application. The following table represents the selected values for R12 of FIG. 1 which effect the particular applications stated above.

| Amps | Resistor (R12) |
|---|---|
| 13 | 0.1Ω |
| 10 | 0.2Ω |
| 5 | 0.33Ω |
| 2.5 | 0.75Ω |

The battery charger of the present invention may also be provided with removable, interchangeable resistor modules to permit a user or technician to selectively reconfigure the charging circuit according to a particular application. Further, a series of resistors or potentiometer may be included in the charger circuit and operatively connected to a resistor or application selection dial or switch. Various automatic selection devices may be incorporated in the battery charger to achieve this result as well. In this manner, the charging amperage of the charger may be selected between several values, such as 2.5, 5, 10, and 13 amps. This permits a variety of batteries with different amp-hr ratings to be charged by a single charger. This could be accomplished mechanically by selectively mating the charger base with various known configurations of batteries.

In effect, microprocessor U3 generates signals that alternatingly connects battery 16 to constant current power supply 14 and switchable load 19. To effect a charge pulse, microprocessor U3 causes Q1 to draw current through transformer 18 in a PWM fashion, as controlled by current mode controller U1. To effect a discharge pulse, microprocessor U3 causes Q3 to draw current from the battery, through load resistor R21 to ground. Charge-neutral wait periods are also interposed in the charge process. Analog to digital (A/D) inputs or ports are provided in circuit 10, specifically microprocessor U3, for the purpose of monitoring the voltage level of the battery during the charging sequence. Voltage measurements are taken periodically throughout the charging process, with the measurements taken during the discharge pulse being load-voltage values, measurements taken during charge pulses being "hot" voltage values, and measurements taken during the rest periods being no-load voltage values.

A voltage selector switch may be provided in circuit 10 to provide manual selection of voltage levels for selecting from a range of battery charging applications. It is also within the scope of the present invention to effect voltage selection in an automatic fashion. In the embodiment illustrated in FIG. 14, multi-position switch SW is provided with switch positions SWA–SWF, which are connected to resistors R12A–R12F, respectively. The operation of the multiple resistor network of FIG. 14 is discussed in detail hereinbelow. It is also possible to connect such a voltage selection switch to input of the microprocessor. The voltage selection switch may direct the microprocessor to change the voltage trigger levels that govern the switching between different charging stages, i.e., load, charge, and rest.

The power source is preferably current-regulated, rather than voltage-regulated. Any number of battery types may be charged by battery charging circuit 10. When charging a 10 ampere battery, circuit 10 varies the voltage such that 10 amperes of current are delivered to battery 16 throughout the charging process. Because the constant current power supply cannot be used to run the logic and support portions of circuit 10, a separate voltage-regulated supply, denoted generally at 24, is used to provide operating voltage as designated at 22. Constant current power supply 14 and voltage-regulated power supply 24 are preferably opto-coupled together for cross-switching noise immunity, such as provided by opto-coupler or opto-isolator 32. Opto-isolator 32 is shown in FIG. 1 having light emitting diode LED1 operating on the battery ground plane with transistor photosensitive device TPD1 operating on the control ground plane.

FIG. 6 depicts a functional block diagram of the battery charger of the present invention. Conventional 120 VAC power supply 12, such as provided at a common residential receptacle, powers battery charger 10. The 120 VAC supply 12 is connected to front end supply 13, as described above, which supplies power to current regulated power supply 14, and voltage regulated power supply 24. Voltage regulated power supply 24 provides operating voltages for the logic circuitry. Microprocessor U3 alternatingly applies constant current power supply 14, via PWM current regulator 17, and switchable load source 19 to rechargeable battery 16. Microprocessor 29, Microchip's model PIC16C71 or equivalent, provides the sequencing signals to drive switching network 27 in accordance with the charging profiles associated with the particular type of battery being charged. Microprocessor 29 is connected via A/D ports to read the voltage of battery 16 during rest periods after charging pulses.

In one embodiment, constant current power supply 14 has a source input (typically 110VAC), a PWM regulation input (around 100 kHz varied duty cycle), a logic driven on/off switch (to totally shut down the constant current source), and an output to the battery (at the rated amperage (e.g. 10 A) with a voltage capability of at least 50% over target battery voltage—typically, this would be 36V+50%=54V). Constant Voltage Source 24 has a source input and voltage output(s) required to drive logic and support circuitry. PWM Current Regulator 17 has a supply input, a logic driven on/off switch (to temporarily shut down the constant current output), a feedback input, and an output to control the constant current source. Switchable load source 19 has a switching device (like a MOSFET) and a high-power resistor connected to the battery connection. This, for example, is designed to draw, when on, about 10 A (for a 10 A charger) at 12V. The logic consists of a supply input, a feedback input, and a logic control to the constant current source, the PWM current regulator, and the switchable load source. Basically, the logic waits for a battery to be connected to the charger, then it powers up the constant current supply. It then proceeds with its charging profile which involves switching the output of the supply on and off (via the PWM controller) and switching the discharge circuitry on and off. The output may be on for up to ¼ second, with a duty cycle of up to 95%. The discharge circuitry will be used much less— usually it is used for only a few milliseconds at a time for less than 2% duty cycle. The logic monitors the battery voltage, and when certain conditions appear, the charger stops and shuts down the constant current source. It should be noted that the constant current output can have a relatively large amount of ripple since it will be capacitively "smoothed" by the battery being charged.

A switch may be provided to manually select between multiple voltages, for example 6 or 12 volt charging. This switch may be effectively connected to the microprocessor and may communicate to the microprocessor a need to change the voltage trigger levels that govern the switching between different charging stages. Since the power source is current regulated, a wide variety and number of batteries can be electrically connected to the battery charger. The charger will supply the voltage so that 10 amperes of current are delivered. Since the constant current supply cannot be used to run the logic and support portions of the unit, a separate voltage-regulated supply is used. They are opto-coupled together for cross-switching noise immunity.

Referring now to the firmware associated with the operation of battery charging circuit 10, in general, the operational steps are as follows: Upon power up, the battery charger is reset and remains operational while waiting for a battery to be connected to connectors 26 of the battery charger. Upon sensing that battery 16 has been connected to the battery charger, through the sensing of a minimum rest voltage by the microprocessor, the battery is charged according to the charging sequence as described earlier and hereinafter. After battery 16 has been charged, the firmware waits for the battery to be disconnected from circuit 10, the firmware loops back to wait for further battery connections and charging. If the battery is disconnected during the charging sequence, the unit resets and waits for a battery to be connected.

While waiting, the circuit, according to the voltage selector position, monitors the A/D port for a required minimum voltage. If no such minimum voltage is present, then the sequence is repeated. Resistors R37 and R40, 10 Kohm and 1 Kohm, respectively, provide a divider circuit at an 11:1 ratio, 11 volts=1 volt, that feeds unity-gain op-amp U2-4. The output of op-amp U2-4 is fed into microprocessor U3, which then interprets this information to determine if the minimum voltage level is sensed and therefore a battery has been connected to the charger. The maximum voltage the analog to digital (A/D) input of microprocessor U3 can handle is 5 volts in increments of 1.95 millivolts (mv). Scaled, this equates to 55 volts in increments of 21 mv. This is sufficiently accurate and gives a good range to charge most types of batteries. The A/D port monitors voltage during rest, load and pulse periods. Battery removal detection is accomplished by the fact that the constant current source will try to deliver a specific current into an infinite impedance, i.e., the voltage goes to the limit of the supply (55 volts). When the microprocessor detects an excessive voltage, it determines that the battery has been disconnected.

Referring now to FIG. 9, prior to the start of the charging process certain supplied values must be provided, such as through a user interface, burned into memory, etc. One such value is the target voltage. For example, if the charger is designed for charging 10 volt batteries, then the target voltage is 10 volts. Another supplied value is the particular type of battery to be charged, such as lead-acid, nickel-cadmium, or nickel-metal-hydride. In the alternative, additional sensing and/or analyzing firmware could be included in the charger to automatically detect the type of battery connected thereto and automatically implement the desired firmware from a plurality of stored application specific programs. Other supplied values include the maximum run time (min), trickle run time (min), and trickle delay (ms). Once these values have been supplied to the charger, the charging process may occur.

Initially, the circuit checks to see if a valid battery is connected to the charger. By way of example, if the target voltage is set at 6 volts, the minimum voltage level at which charging would proceed is about 3 volts. If the battery connected to the charger did not possess a voltage of at least 3 volts, the charger would not begin charging. Even after a battery has been discharged, if it is in an undamaged state it should drift up to at least a certain minimum voltage. It the battery is damaged or defective in some manner, such as an open cell, then the charger will recognize this and give some indication of the existence of a battery fault condition. If no battery is connected to the charger, then the charger detects no voltage and charging will not begin.

The battery charger of the present invention is intended for use with many types of batteries, including, for example, lead, nickel, cadmium, zinc, and lithium based batteries. Such rechargeable batteries may be for use with a wide range of products and in a vast array of diverse applications, such as motorized devices (i.e., cars, trucks, bicycles, golf carts, toys), cellular phones, computers, communications equipment, recorders, military applications (i.e., aircraft, tanks, submarines, ships, etc.), heavy industrial equipment (i.e., forklifts), etc. Virtually any kind of electronic product that requires a source of power. The battery of the present invention may be configured in any of a wide range of values, from 0–500 volts and from 0–1000 amps depending upon the application. It is further intended that certain other features may be added to the battery charger to enhance overall performance and user/operator interface. One such feature is an LCD display and accompanying firmware which would allow selection of the battery type and give indication as to the type of battery being charged, the charge level attained by the battery, duration of charge, charge period remaining/elapsed, battery temperature, etc.

From a design standpoint, one goal is to provide a charger that can charge a battery in the least amount of time without harming the battery using a combination of charge and discharge pulses and essentially electrically-neutral rest or wait periods. The discharge pulse, is preferably as strong as allowable given the limits of the battery to be charged, to reduce the amount of time that it takes. This factor will be determined by the battery's maximum surge current rating. The discharge pulse is preferably as short as possible since it is a negative charging activity, but, the longer it is, the more impedance reduction takes place in the battery, allowing for longer charge pulses. The charge pulse is preferably as long as possible, since it is a positive charging activity. The charge pulse is preferably as strong as allowable without harming the battery, to reduce the amount of time that it takes to fully charge the battery. The battery's maximum theoretical charge rate, or C, will determine this. Optimally, the charge pulse delivers the maximum allowable current with the least amount of voltage, since voltage over the battery's barrier potential is harmful. The rest period is preferably as short as possible, since it is essentially a non-value-added activity and used primarily for battery stabilization. To determine what the charge pulse limit is, for a given discharge pulse, we can apply the pulse until the voltage reaches our predetermined limit, past which we know damage would occur. Change the discharge pulse, and a change in maximum charge pulse duration should follow. The longer the discharge pulse, the longer the allowable charge pulse, however, this does not occur as a linear function. The following formula helps to rate given discharge/charge sequences:

$$A_T = ((A_C \times Ts_C) - (A_D \times Ts_D))/Ts_T$$

where $A_T$ represents the total charge in amps delivered to the battery; $A_C$ represents the amperage of the charge pulse; $Ts_C$ represents the time duration of the charge pulse; $A_D$ represents the amperage of the discharge pulse; $Ts_D$ represents the time duration of the discharge pulse; and $Ts_T$ represents the time duration of the total charge sequence.

For example, if we have a 10 A lead-acid charger, and the discharge device drains at a rate of 40 A, with a charge profile of a 2 ms discharge pulse, a 100 ms charge pulse, and a 1 ms rest period then:

$$((10 \text{ A} \times 100) - (40 \text{ A} \times 2))/(100+2+1) = 8.932 \text{ A}$$

Assuming the charge pulse may be extended out to 126 ms, an increase in delivered amperage results:

$$((10 \text{ A} \times 126) - (40 \text{ A} \times 2))/(126+2+1) = 9.147 \text{ A}$$

Assuming that if the discharge pulse is reduced to 1 ms a charge pulse of 68 ms is obtainable, the following results:

$$((10 \text{ A} \times 68) - (40 \text{ A} \times 1))/(68+1+1) = 9.142 \text{ A}$$

So, in this hypothetical example, it would be slightly worse to have a smaller discharge pulse. Assuming that by increasing the discharge pulse to 3 ms we can get a charge pulse of 148 ms, the following delivered amperage results.

$$((10 \text{ A} \times 148) - (40 \text{ A} \times 3))/(148+3+1) = 8.947 \text{ A}$$

Again, worse than the 2 ms optimal situation. From these results, it is seen that a peak is formed between 1 ms and 3 ms discharge pulses. It may be exactly, more, or less than 2 ms. The rest period may be optimized after an initial optimal discharge time has been achieved.

The standard charge profile for lead-based batteries is shown in FIGS. 3A and 12 and consists of the following three steps: load the battery for 2 milliseconds, charge the battery for 100 milliseconds, and then wait for a rest period of 1 ms. As illustrated in FIG. 3B, an optional trickle charge sequence may be implemented near the end of the charging process to more fully complete the charge. During the trickle charge, the standard charge profile is used with the exception that a 251 millisecond rest period is substituted for the 1 millisecond rest period. A set duration may be assigned to this stage, such as a period of 1 hour.

FIGS. 2A and 2B illustrate a flow chart representing a battery charging sequence, which includes the more particular charge profile of FIGS. 3A and 12, for particular use with lead-based batteries. The flow charts of FIGS. 2A, 2B, and 12 and the timing profile of FIGS. 3A and 3B describe the firmware associated with the operation of the lead-based battery charging circuit of FIG. 1.

In lead-based applications, the battery charger of the present invention executes the standard charge profile; 2 ms of load time, 100 ms of charge time, and a 1 ms wait period. The battery charger may use a variable rest time, the value of which depends on the state of charge in the battery. The wait period may be lengthened as the battery nears a complete charge, this adds further stability during the charging sequence. The critical relationship is the 2 ms load time and the 100 ms charge time as well as the respective magnitudes of the charge and discharge pulses. This produces the desired effect on battery impedance to charge lead-based batteries most effectively and efficiently.

While charging a battery, a battery stores a charge in two ways. One way is through the designed way where the plates hold ions either positive or negative on either side. But there is a second way caused by the natural effect of having two plates of metal next to each other, they naturally act with a slight degree of capacitance. This is very minimal but when you are charging the battery, you will load that capacitance up and it naturally sort of increases the impedance of the battery. This is not as critical when using a linear charging device. However, when charging a battery with a non-linear charging system as by pulsing the battery, then it is much more significant a factor. The discharge pulse removes that natural capacitance and thereby further lowers the impedance of the battery and allows a lower charging voltage to be used. The closer the discharge pulse precedes the charge pulse the better, because any wait period between the discharge pulse and the charge pulse allows the battery to naturally recharge. This intermediate recharging raises the voltage, the capacitance, and the impedance of the battery and requires a greater charging voltage to be used to move the desired fixed amount of current. Applying a discharge pulse after, rather than before, the charge pulse, as commonly found in earlier charging devices, greatly minimizes the benefit of the discharge pulse and results in decreased effectiveness. Placing the discharge pulse after the charge pulse is an attempt to minimize any damage to the battery, placing the discharge pulse prior to the charge pulse helps prevent any such damage to a battery. By placing the discharge pulse before the charge and measuring the voltage of the battery after applying the discharge pulse, a more accurate reading of the true state of charge of the battery is realized.

As described by the flow chart of FIGS. 2A and 2B, the charger first verifies that a battery has been connected to the charger, as discussed above. The charger then runs a self-test to ensure that the pulse power supply is functioning properly and providing an acceptable charging source. The charger monitors the battery connection to verify that the battery has been connected to the charger for at least 2.5 seconds. The charger then monitors the voltage selector switch, if one is provided, to set the appropriate charging voltage limits. Again, the charger may be dedicated to a particular battery type of predetermined voltage. In the example of FIG. 2A the maximum run time is set to one hour and forty-five minutes. Picking up with the charging process at the top of FIG. 2B, the charger next performs the charge-discharge cycle, as described above and below and further illustrated in more detail in FIG. 12. Certain safety routines are provided to protect the battery being charged from becoming damaged. If the circuit detects that the voltage level of the battery has ramped up too rapidly, then a battery fault indication will occur and the charging process will terminate. If the circuit detects that the maximum run time has expired, then a battery fault indication will be given and the charging process will terminate. As discussed further below, the charging process may involve more than just the standard profile, additional stages may be interposed to provide a more custom charging sequence depending upon the application. After charging the battery, the charger waits for the battery to be disconnected, upon disconnection the charger loops back to wait for the next battery. If the battery is disconnected during the charge sequence, the unit resets. Waiting for a battery to be connected is fairly simple, the charger checks the voltage selector position, if one is provided, reads the A/D port to see if the required minimum voltage is met, and if not, it repeats the sequence. As an added safety mechanism to prevent sparking, only when the requisite minimum voltage is measured five times in a row in the span of approximately two and one-half seconds will the charger actually start the charging process. This allows the user to secure the connections.

In an alternative embodiment, the battery may be charged in four stages. Stage one performs the standard charge profile, applies the load for 5 ms, and rests for 10 ms. This is done until a certain initial voltage is reached, after which the firmware progresses to stage two. Stage two applies the load for 2 ms, performs the standard charge profile 5 times with only a 1 ms rest between, waits 8 ms, applies the load for 10 ms, and waits another 10 ms. When the next voltage level is reached, the charger transitions to the next stage. This third pre-defined end charge stage performs the standard charge, then rests for 100 ms. It repeats this for 2 minutes, regardless of voltage levels. The green LED becomes and remains lit, indicating to the user that the unit has completed charging. The firmware then goes to the trickle charge mode which is almost the same as the end charge stage, except that the rest time is 500 ms, and the duration of the stage is 1 hour.

Figure 13A:
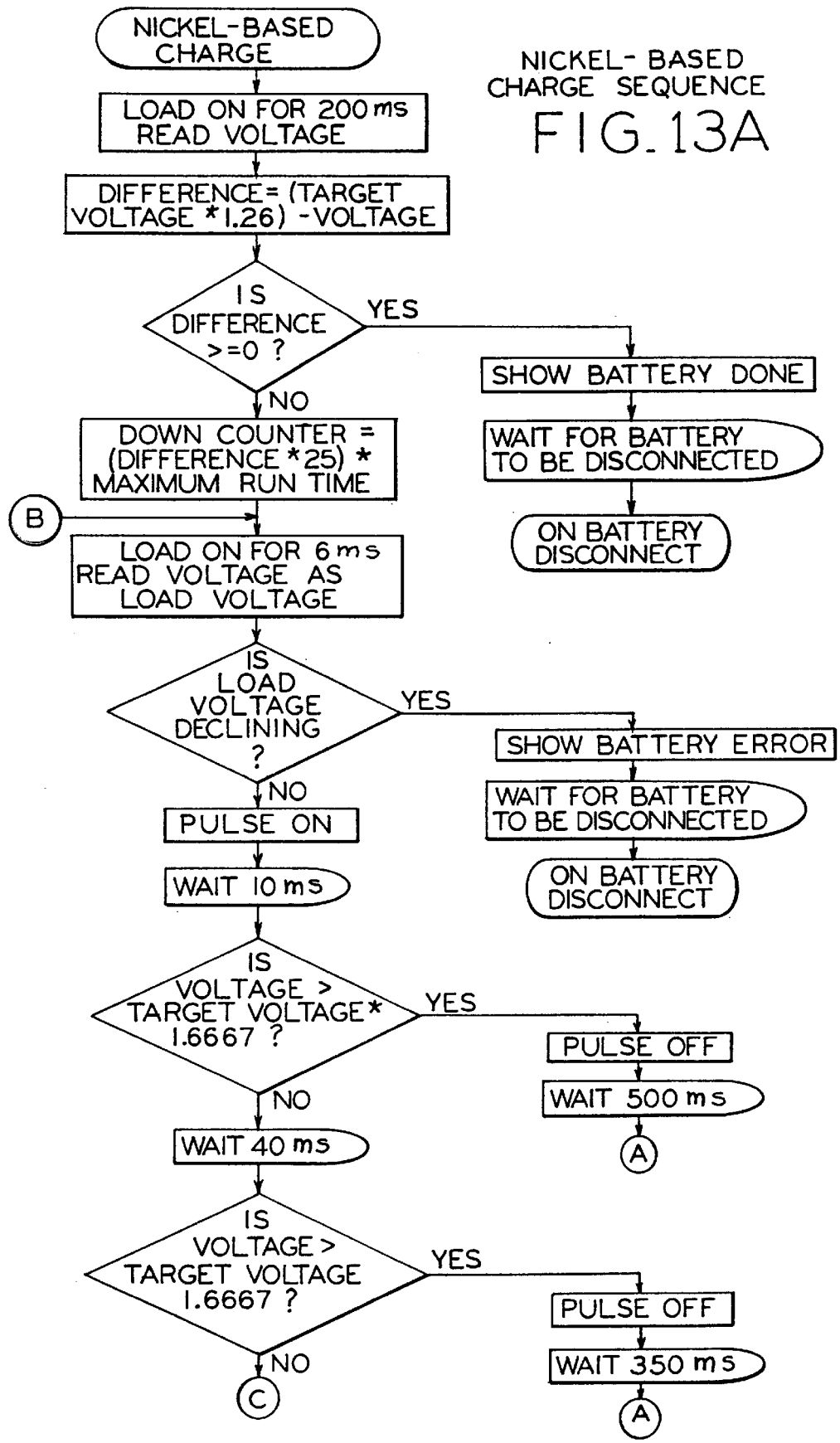
FIG. 13A is a flow chart illustrating a first part of the nickel-based battery charging sequence associated with the primary charger control sequence of FIG. 9.

In nickel-based applications, including nickel-cadmium (Ni—Cad) and nickel-metal-hydride (NiMH) applications, the present invention battery charger, in one embodiment, uses the following standard charge profile; 6 ms of load time, 200 ms of charge time, then 50 ms of rest time, as illustrated in FIGS. 5, 13A, and 13B. The 200 ms of charge time is a critical value. Significantly more than 200 ms causes an over-extension of the "shock", resulting in the battery being unable to accept the charge. Significantly less than 200 ms causes the battery to develop a large potential (voltage), but there is no current behind it. It would be as if you had a 500 foot tall water tower that only contained a few gallons. The 6 ms load time is also important, as it was selected to bring the battery impedance to the lowest practical value to best match the 200 ms charge pulse. The effect of the discharge pulse is to lower the impedance and the voltage levels of the battery so that additional current may be received by the battery, with a constant current supply, the charge pulse is generally lengthened by discharging the battery shortly therebefore. The greater the discharge of the battery, the longer the duration of the charge pulse may be. In designing the optimal durations of the discharge and charge pulse, there is a point of diminishing returns where greater discharging of the battery fails to appreciably extend the charge pulse and may in fact prolong the overall charge time due to excessive draining of the battery. It should be understood that these values will change depending upon the particular battery application. At the start of each pulse charge/discharge, the load is applied, and just before it is turned off, the battery voltage is read. This provides a good approximation of what the battery's true voltage is.

A problem associated with Ni—Cad batteries is overcurrent charging, which may cause a Ni—Cad battery to suddenly act "disconnected" after a load is applied. The voltage seen by the charger suddenly becomes very low, just like it would if the battery were truly disconnected. Until the battery recovers, if a load is put on the battery, only a tiny fraction of the battery's voltage appears across the load. It will stay locked in this mode until the load is removed. After a wait period of say 1–5 seconds, the battery's voltage returns to normal. This effect complicates charging.

Because of this abnormality, an abort sequence is provided in the firmware to at least momentarily halt the charging process and to bring the battery back to a normal condition. As described below in detail, should the battery voltage exceed a predetermined maximum at some point during the charge pulse, the charge pulse is terminated and the wait period is extended in an attempt to prevent this occurrence. As shown in the flow chart of FIG. 13B, when the battery appears to be disconnected, the charger discontinues charging and waits three seconds. If the battery still appears to be disconnected, then the charger permanently discontinues charging and transitions to the "ON BATTERY DISCONNECT" position in the primary charger control sequence of FIG. 9. If the battery merely exhibited a momentary spurious reading and then, after the three second wait period, returned to a normal condition, the charger resumes nickel-based charging.

The top priority in charge profile design is to avoid this effect before it happens. This is done by reading the battery while the pulse is being delivered as shown in FIG. 5, 13A, and 13B. If, during the pulse, the voltage exceeds the maximum charge threshold, i.e., target voltages times 1.667, the charge pulse is terminated and the rest period is extended. The length of the rest period depends on when the threshold was crossed. The table below shows the pulse check-points and the duration of the extended wait period if the threshold is crossed at that check-point.

| Pulse Check-Point | Rest Time if Threshold is Crossed (In Addition to the Normal 50 ms) |
| --- | --- |
| 10 ms | 500 ms |
| 50 ms | 350 ms |
| 100 ms | 250 ms |
| 150 ms | 200 ms |
| 200 ms | 150 ms |

If, after the rest time, the battery is still over the threshold or the battery exceeded its "break over" limit, then a virtual "disconnect" or possibly a real one has occurred. The charger, in accordance with the abort routine discussed above, waits for 3 seconds to allow the battery to recover. The voltage is read, if it is still out-of-range, the charger assumes the battery has been disconnected by the user, if it is not out-of-range charging resumes. The problem is further exacerbated by protection circuitry that is included in some batteries to limit the voltage or current. Certain circuitry to protect batteries from being charged at excessive charging temperatures will have voltage induced into it by the charging method.

Further complicating matters, Ni—Cad batteries often make it difficult to obtain an accurate voltage reading while charging. Because of this, an ultimate limit on the amount of time needed to charge is set at the beginning of charging as shown in the flow chart of FIG. 13A. Prior to charging, a 200 ms discharge pulse is applied to the battery, its voltage is read, and a maximum charge run time is calculated based on how far the measured voltage is away from the supplied target voltage. Usually, the battery reaches its target voltage before reaching the maximum run time, whereupon the time is cut short. The maximum run time prevents a weakened battery from being forced to try and achieve a target voltage it can no longer hold. As an additional safety measure, a negative delta-voltage sequence may be employed, as shown in FIG. 13A, to terminate charging operation in the event subsequent voltage measurements exceed previous voltage measurements, i.e., the load voltage declines.

From a hardware standpoint the charger accomplishes this task by way of constant current power supply 14 and load source 19, which are digitally switched via microprocessor U3 having A/D ports to read the voltage of the battery during charge. For example, three different models capable of delivering 2.5, 5 and 10 amps of current may be developed from a standard charger circuit design with minimal modification. Each of these may be provided with a switch on the front to allow a user to choose between a plurality of different target voltages, so the same model can be used to charge two or more different battery types. The switch may be connected to the microprocessor, and its function entirely determined by firmware. When choosing a unit to charge a battery, a unit must be capable of providing sufficient current delivery that will charge the battery in a reasonable time but yet not overcharge the battery so as to cause the "disconnect" effect.

Two to three times C, where C equals the rated capacity of the battery, seems to be the optimum balance, although the ratio may be as high as five times C. For example, a 1200 mAH battery may be charged by a 2.5 A unit (a little more than 2C). At a 2C rate, a totally dead battery could, in theory, be fully charged in a half hour. Since the power source is current regulated, not voltage regulated, any number of or types of batteries could be hooked-up, and the charger will make the voltage so that 2.5 amperes of current are delivered to the battery because constant current supply 14 cannot be used to run the logic and support portions of the unit, a separate voltage-regulated supply 24 is used. They are opto-coupled together for cross-switching noise immunity.

An operational flowchart is provided at FIGS. 4A and 4B and a corresponding charge cycle timing diagram is illustrated at FIG. 5. Upon power-up the charger first verifies that a battery has been connected to the charger, as discussed above with respect to lead-based applications. The charger then runs a self-test to ensure that the pulse power supply is functioning properly and providing an acceptable charging source. The charger monitors the battery connection to verify that the battery has been connected to the charger for at least 2.5 seconds. The charger then monitors the voltage selector switch, if one is provided, to set the appropriate charging voltage limits. Again, the charger may be dedicated to a particular battery type of predetermined voltage. In the case of nickel-based batteries, the maximum run time is determined according to how far away the battery is from its target voltage. A load is applied for 200 ms and a voltage measurement taken toward the end thereof to determine the voltage of the battery prior to charging. Picking up with the charging process at the top of FIG. 4B, the charger next performs the charge-discharge cycle, as described above and below and further illustrated in more detail in FIGS. 13A and 13B.

Certain safety routines are provided to protect the battery being charged from becoming damaged. If the circuit detects that the voltage level of the battery has ramped up too rapidly, then a battery fault indication will occur and the charging process will terminate. If the circuit detects that the maximum run time has expired, then a battery fault indication will be given and the charging process will terminate. An optional tickle charge is sometimes used to "top-off" the battery. This is like the regular charge, but with a one second rest period between pulses, and it usually runs for about 5 minutes. After charging the battery, the charger waits for the battery to be disconnected, upon disconnection the charger loops back to wait for the next battery. If the battery is disconnected during the charge sequence, the unit resets. Waiting for a battery to be connected is fairly simple, the charger checks the voltage selector position, if one is provided, reads the A/D port to see if the required minimum voltage is met, and if not, it repeats the sequence. As an added safety mechanism to prevent sparking, only when the requisite minimum voltage is measured five times in a row in the span of approximately two and one-half seconds will the charger actually start the charging process. This allows the user to secure the connections.

Prior to being charged, an unformatted battery must be formatted or electro-chemically initialized to hold a charge. FIGS. 7A, 7B, and 8 depict charge cycle timing diagrams and a flow chart representing a preferred formation charge profile of the battery charger of the present invention. The formation operation of the battery charger of the present invention applies alternating steps of charge pulses, discharge pulses, and wait/rest periods in a most effective manner. Prior art battery formation chargers merely delivered steady voltages and slowly ionized the electrolyte in the battery, which could not absorb all the energy delivered resulting in potentially harmful heat generation. In part because prior art chargers delivered a certain fixed voltage level, just above the normal capacity of the battery being charged, and in part because of the static resistance of the battery, only a certain amount of current was delivered. The amount of this current is almost always too much for an ongoing charge. Also, at various points of the charging process the resistance of the battery changes, further complicating the formation process.

A pulse formation charger "shocks" a charge into the battery, but he amount of positive-going rail-to-rail voltage measured across the battery is not very significant. If the battery were discharged by a load just before it received a charge pulse, the positive rail-to-rail voltage would be increased, thereby "shocking" the battery even harder. The formation battery charger of the present invention uses a current regulated power delivery system. Accordingly, the static battery resistance cannot be a factor, however, battery impedance is, and is affected by the frequency and duty cycle of the pulse chargers. The idea is to lower the impedance of the battery, resulting in a lower charge voltage to deliver the fixed amount of current.

The battery formation charger of the present invention essentially uses the formation profile shown in FIG. 7B; 2 ms of load time, followed by 100 ms of charge time, followed by 200 ms of rest time. However, at the very beginning of the formation process the battery holds no charge and does not need to be discharged. Accordingly, the initial formation profile of FIG. 7A is used until the battery reaches a minimum threshold voltage level. Upon detecting that the minimum threshold voltage has been reached the formation process transitions to the subsequent formation profile of FIG. 7B. The critical element is the 2 ms load time and 100 ms charge time. This reduces the impedance of the battery as desired to format the battery most effectively and efficiently.

From a hardware standpoint, the formation charger accomplishes this task by way of digitally switched current regulated power supply 14, digitally switchable load source 19, and microprocessor U3 (Microchip's PIC16C71) to switch them. One way of accomplishing this is to provide a switch for selecting between RUN or PAUSE formation positions. This switch may be connected to an input of the microprocessor and does not directly affect the operation of the hardware. Because constant current supply 14 is current regulated rather than voltage regulated, any number or type of batteries may be hooked-up, and the charger will make the voltage so that the fixed current is delivered to the battery. From a firmware point of view, the operation is quite simple. Upon power-up, reset, check the run/pause switch position. If on, format the battery.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A process for rapidly charging a battery by a battery charger having an input connected to a source of power, the battery charger providing alternating charge and discharge pulses to the battery, the charging process comprising the steps of:
   a) partially discharging the battery by means of a discharge pulse substantially immediately prior to a charge pulse to lower the impedance and the voltage of the battery prior to the charge pulse being delivered to the battery;
   b) substantially immediately after partially discharging the battery, supplying the charge pulse to the battery, the charge delivered to the battery during the charge pulse being greater than the charge drained from the battery during the discharge pulse, the ratio of the duration of the charge pulse to the discharge pulse being greater than 10 to 1.
   c) waiting a rest period after the charge pulse of step b) and prior to applying a subsequent discharge pulse to the battery to allow the battery to at least partially stabilize; and d) repeating the above steps.

2. The process of claim 1, wherein the rest period is shorter in duration than the charge pulse of step b) over the majority of the charging process.

3. The process of claim 1, wherein the battery charger provides a constant current supply.

4. The process of claim 3, wherein the battery charger is one of a linear or a switching constant current supply.

5. The process of claim 1 further comprising the step of detecting the charge of the battery, initiating the charging process upon detecting a first predetermined threshold value, and terminating the charging process upon detecting a second predetermined threshold value.

6. The process of claim 1 further comprising the step of measuring the voltage of the battery, initiating the charging process upon detecting a first predetermined minimum voltage value, and terminating the charging process upon detecting a second predetermined maximum voltage value.

7. The process of claim 6, wherein the step of measuring the voltage of the battery occurs during the discharge pulse.

8. The process of claim 7, wherein the step of measuring the voltage of the battery occurs substantially at the end of the discharge pulse and before the charge pulse begins.

9. The process of claim 6 further comprising the step of trickle charging the battery near the end of the charging process upon measuring a predetermined trickle threshold voltage value intermediate the first and second voltage values, the trickle charge comprising steps a) through d) with the duration of the rest period of step c) extended to be about equal to or greater than the duration of the charge pulse of step b).

10. The process of charging a battery of claim 9, wherein the step of trickle charging is conducted over a predetermined fixed period of time.

11. The process of claim 1 further comprising the step of monitoring the voltage of the battery and preventing the voltage of the battery from exceeding the battery's barrier potential, thereby preventing heat generation and damage to the battery during the charging process.

12. The process of claim 1, wherein the ratio of charge delivered to the battery during the charge pulse to the charge drained from the battery during the discharge pulse is about between 10 to 1 and 200 to 1.

13. The process of claim 1, wherein the battery is a lead-based secondary cell type rechargeable battery.

14. The process of claim 13, wherein the discharge pulse has a duration of about no more than 10 milliseconds.

15. The process of claim 13, wherein the charge pulse has a duration of about 100 milliseconds.

16. The process of claim 13, wherein the rest period has a duration of about 1 millisecond over a significant portion of the charging process.

17. The process of claim 13, wherein the ratio of the duration of said charge pulse to the duration of said discharge pulse is within a range of about between 10 to 1 and 100 to 1.

18. The process of charging a battery of claim 13, wherein the ratio of the duration of said charge pulse to said rest period is within a range of about 10 to 1 and 200 to 1.

19. The process of claim 13, wherein the battery has a defined charge storage capacity and the charging rate of the battery charger is approximately equal to the charge storage capacity of the battery being charged.

20. The process of claim 1, wherein the battery is a nickel-based secondary cell.

21. The process of claim 20, wherein the battery is one of a group consisting of Nickel—Cadmium and Nickel Metal Hydride.

22. The process of claim 20, wherein the discharge pulse has a duration of about no more than 10 milliseconds.

23. The process of claim 20, wherein the charge pulse has a duration of about 200 milliseconds.

24. The process of claim 20, wherein the rest period has a duration of about 50 milliseconds over a significant portion of the charging process.

25. The process of claim 20, wherein the ratio of the duration of said charge pulse to the duration of said discharge pulse is within a range of about between 10 to 1 and 100 to 1.

26. The process of claim 20, wherein the ratio of the duration of said charge pulse to said rest period is within a range of about between 3 to 1 and 45 to 1 over a majority of the charging process.

27. The process of claim 20 further comprising the step of taking periodic measurements of the battery voltage throughout the charging process, temporarily suspending the charge pulse and lengthening the rest period based upon taking a voltage measurement that exceeds a predetermined voltage threshold, applying a discharge pulse at the end of the rest period and taking a subsequent voltage measurement during the discharge period, and terminating charging operation should the subsequent voltage measurement exceed the predetermined voltage threshold or continuing the charging process should the subsequent voltage measurement be less than the predetermined voltage threshold.

28. The process of claim 20, wherein the battery has a defined charge storage capacity and the charging rate of the battery charger is up to five times the charge storage capacity of the battery being charged.

29. The process of claim 1, wherein the charge pulse, discharge pulse, and rest period are collectively less than one second in duration.

30. The process of claim 1, wherein the battery charger provides a constant current supply comprising a plurality of selectable constant current charge levels.

31. The process of claim 30 further comprising the step of selecting a desired constant current charge level from the plurality of constant current charge levels.

32. The process of claim 31, wherein the step of selecting the desired constant current charge level is accomplished by a microprocessor.

33. The process of claim 31, wherein the step of selecting the desired constant current charge level is accomplished by selecting from a plurality of resistors.

34. The process of claim 31, wherein the step of selecting the desired constant current charge level is accomplished by manipulating a switch having a plurality of settings.

35. The process of claim 1 further comprising the step of measuring the voltage of the battery and comparing a first measured battery voltage level with a subsequent second measured battery voltage level, and, upon detecting that the first measured voltage level is greater than the second measured voltage level, terminating the charging process.

36. The process of claim 35 further comprising the step of providing indication of a battery fault condition upon detecting that the first measured voltage level is greater than the second measured voltage level.

37. The process of claim 1 further comprising the step of measuring the voltage of the battery and comparing a first measured battery voltage level with a subsequent second measured battery voltage level, and upon detecting that the difference between the first and second measured values exceeds a predetermined maximum value, terminating the charging process.

38. The process of claim 37 further comprising the step of providing indication of a battery fault condition upon detecting that the difference between the first and second measured voltage levels exceeds the predetermined maximum value.

39. The process of claim 1 further comprising the step of measuring the voltage of the battery before initiating steps a) through d) and providing a predetermined time limit for the duration of the charging process based upon the measured voltage and terminating the charging process upon reaching the time limit.

40. The process of claim 39 further comprising the step of providing indication of a battery fault condition upon reaching the time limit.

41. The process of claim 1 further comprising the step of applying a pre-charge discharge pulse prior to initiating steps a) through d), measuring the battery's pre-charge voltage during the pre-charge discharge pulse, and determining a charge process time limit based upon the battery's measured pre-charge voltage.

42. The process of claim 1 further comprising the step of measuring the voltage of the battery and varying one or more of the discharge pulse, charge pulse, and rest period in accordance with one or more predetermined threshold voltage values.

43. The process of claim 42, wherein the duration of the rest period is increased as the measured voltage increases during the charging process.

44. The process of claim 1, wherein the battery charger is microprocessor-based and includes memory adapted to store the predetermined sequencing of the alternating charge pulse, discharge pulse, and rest period.

45. The process of claim 1, wherein the battery charger is driven by an application specific integrated circuit adapted to provide the predetermined sequencing of alternating constant charge pulse, discharge pulse, and rest period.

46. The process of claim 1 comprising the further step of providing a charge initialization stage prior to steps a) through d) that is essentially identical to steps a) through d), except with the rest period of the charge initialization stage being substantially longer than the rest period of step d).

47. The process of claim 46, wherein the charge initialization stage continues for a fixed predetermined period of time.

48. An apparatus for rapidly charging a battery comprising:
an output adapted to be electrically connected to a battery;
a charge pulse generator adapted to provide a charge pulse at said output to charge the battery;
a discharge device adapted to provide a discharge pulse at said output to drain current from the battery to lower the impedance of the battery, the ratio of the duration of the charge pulse to the discharge pulse being greater than 10 to 1; and
a control device alternatingly connecting said discharge device, and said charge pulse generator to said output so as to alternatingly provide said discharge pulse, and charge pulse, and an electrically neutral rest period, respectively, to the battery, said discharge pulse, charge pulse, and rest period being applied to the battery in a predetermined standard charging sequence in which said discharge pulse is applied substantially immediately prior to said charge pulse.

49. The battery charging apparatus of claim 48, wherein said charge pulse generator comprises a constant current supply.

50. The battery charging apparatus of claim 49, wherein said constant current supply is one of a linear and a switching constant current supply.

51. The battery charging apparatus of claim 48, wherein the battery is a lead-based secondary cell rechargeable battery.

52. The battery charging apparatus of claim 51, wherein said discharge pulse has a duration of about no more than 10 milliseconds.

53. The battery charging apparatus of claim 51, wherein the charging pulse has a duration of about 100 milliseconds.

54. The battery charging apparatus of claim 51, wherein the rest period has a duration of about 1 millisecond over a significant portion of the charging process.

55. The battery charging apparatus of claim 51, wherein the ratio of the duration of said charging pulse to the duration of said discharge pulse is within a range of about between 10 to 1 and 100 to 1.

56. The battery charging apparatus of claim 51, wherein the ratio of the duration of said charging period to said rest period is within a range of about between 10 to 1 and 200 to 1.

57. The battery charging apparatus of claim 51, wherein the battery has a defined charge storage capacity and the charging rate of said battery charging apparatus is up to one and one-half times said battery charge storage capacity.

58. The battery charging apparatus of claim 48, wherein the battery is one of a group consisting of Nickel Cadmium and Nickel Metal Hydride types of batteries.

59. The battery charging apparatus of claim 58, wherein said discharge pulse has a duration of about no more than 10 milliseconds.

60. The battery charging apparatus of claim 58, wherein the charging pulse has a duration of about 200 milliseconds.

61. The battery charging apparatus of claim 58, wherein the rest period has a duration of about 50 milliseconds over a significant portion of the charging sequence.

62. The battery charging apparatus of claim 58, wherein the ratio of the duration of said charging pulse to the duration of said discharge pulse is within a range of about between 10 to 1 and 100 to 1.

63. The battery charging apparatus of claim 58, wherein the ratio of the duration of said charge pulse to said rest period is within a range of about between 10 to 1 and 200 to 1.

64. The battery charging apparatus of claim 58, wherein the battery has a defined charge storage capacity and the charging rate of said battery charging apparatus is up to five times said charge storage capacity.

65. The battery charging apparatus of claim 58, wherein said control device is adapted to provide a charge initialization sequence prior to said standard charging sequence in which said discharge pulse is greater in duration than during said standard charging sequence.

66. The battery charging apparatus of claim 48, wherein said discharge device comprises a load electrically connected to the battery, whereby during the discharge pulse current is drained from the battery through the load.

67. The battery charging apparatus of claim 48, wherein said discharge device comprises a switching element and a resistor, said switching element is disposed in series with the battery and said resistor, whereby during the discharge pulse current is drained from the battery through said switching element and said resistor to ground and said resistor dissipates power stored in the battery.

68. The battery charging apparatus of claim 67 wherein the ohmic value and power rating of said resistor determines the rate at which power is dissipated from the battery and determines the ratio of the durations of the charge and discharge pulses.

69. The battery charging apparatus of claim 67, wherein said switching element is a semiconductor-based element.

70. The battery charging apparatus of claim 69, wherein said switching element comprises at least one transistor in which the current flowing from the battery through said resistor flows through a collector and emitter of said transistor.

71. The battery charging apparatus of claim 70, wherein said at least one transistor is a MOSFET-type transistor.

72. The battery charging apparatus of claim 67, wherein current is drawn through said resistor at about five to six times the charge capacity rating of the battery during said discharge pulse.

73. The battery charging apparatus of claim 49 further comprising a battery charge detector adapted to be connected to the battery, said standard charging sequence being initiated upon said detector detecting a first threshold value and terminated upon said detector detecting a second threshold value.

74. The battery charging apparatus of claim 73, wherein said battery charge detector measures the voltage level of the battery, and said first and second threshold values are minimum and maximum voltage measurements, respectively.

75. The battery charging apparatus of claim 74, wherein said battery charge detector measures the voltage level of the battery during the discharge pulse.

76. The battery charging apparatus of claim 75, wherein said battery charge detector measures the voltage level of the battery substantially at the end of said discharge pulse and before said charge pulse.

77. The battery charging apparatus of claim 74, wherein said control device is adapted to effect a trickle charge sequence near the end of said standard charging sequence upon said battery charge detector detecting a third predetermined voltage value intermediate said first and second voltage values, and said trickle charge sequence is essentially the same as said standard charging sequence except that the duration of said rest period is about equal to or greater than the duration of said charge pulse.

78. The battery charging apparatus of claim 77, wherein said trickle charge is conducted over a predetermined fixed period of time.

79. The battery charging apparatus of claim 73, wherein said battery charge detector monitors the voltage of the battery and terminates the charging process to prevent the voltage of the battery from exceeding the battery's barrier potential, thereby preventing heat generation and potential injury to the battery during the charging process.

80. The battery charging apparatus of claim 48 further comprising an opto-isolator device, said charge pulse generator comprising a power supply having a ground plane, said opto-isolator being electrically disposed intermediate said power supply ground plane and the ground plane of said control device.

81. The battery charging apparatus of claim 80, wherein said opto-isolator device comprises a light emitting diode operating on said control device ground plane and operatively coupled with a transistor photosensitive device operating on said power supply ground plane, and said transistor photosensitive device senses the state of said light emitting diode.

82. The battery charging apparatus of claim 48, wherein said discharge device lowers the impedance of the battery substantially immediately prior to said charge pulse, thereby enhancing the current receiving properties of the battery.

83. The battery charging apparatus of claim 48, wherein said discharge device reduces the natural capacitance of the battery.

84. The battery charging apparatus of claim 48, further comprising a voltage selector connected to said charge pulse generator and having a plurality of voltage level settings corresponding to acceptable rated voltage levels of batteries to be connected to said battery charging apparatus for charging.

85. The battery charging apparatus of claim 84, wherein said voltage selector is set to a selected one of said plurality of voltage settings corresponding to the rated voltage of the battery being charged.

86. The battery charging apparatus of claim 85 further comprising a battery charge detector connected to the battery, the charging process being initiated upon said detector detecting a first threshold value and terminated upon said detector detecting a second threshold value, and wherein said battery charge detector measures the voltage level of the battery, said first and second threshold values are minimum and maximum voltage measurements, respectively, and the value of said first minimum threshold value is about two-thirds of the selected voltage.

87. The battery charging apparatus of claim 86, wherein said selected voltage setting is 12V and said first minimum threshold value is about 8V.

88. The battery charging apparatus of claim 48, wherein said control device further comprises a battery charge detector and a comparator, said detector is adapted to measure the voltage level of the battery, said comparator includes a first input receiving a first measured battery voltage value and a second input receiving a subsequent second measured battery voltage value, and, upon said comparator detecting that said first measured voltage value is greater than said second measured voltage value, said control device terminating the standard charging sequence.

89. The battery charging apparatus of claim 88 further comprising an indicator, said indicator providing indication that a battery fault condition exists upon said comparator detecting that said first measured value is greater than said second measured value.

90. The battery charging apparatus of claim 48, wherein said control device further comprises a battery charge detector and a comparator, said detector is adapted to measure battery voltage, said comparator includes a first input receiving a first measured battery voltage value and a second input receiving a subsequent second measured battery voltage value, and, upon said comparator detecting that the difference between said first and second measured values exceeds a predetermined maximum value, said control device terminating the charging operation.

91. The battery charging apparatus of claim 90 further comprising an indicator, said indicator providing indication that a battery fault condition exists upon said comparator detecting that the difference between the first and second measured values exceeds said predetermined maximum value.

92. The battery charging apparatus of claim 48 further comprising a clock, said control device terminating the charging process upon said clock reaching a predetermined time limit.

93. The battery charging apparatus of claim 92 further comprising an indicator, said indicator providing indication that a battery fault condition exists upon said control device reaching said time limit prior to terminating charging operation.

94. The battery charging apparatus of claim 92 further comprising a battery voltage detector adapted to measure battery voltage, said control device applying a discharge pulse prior to initiating said standard charging sequence and measuring the battery's pre-charge voltage, said control device determining said time limit based upon said battery pre-charge voltage.

95. The battery charging apparatus of claim 48 further comprising a battery voltage detector adapted to measure the voltage of the battery, wherein said control device varies one or more of the discharge pulse, charge pulse, and rest period in accordance with one or more predetermined threshold voltage values.

96. The battery charging apparatus of claim 94, wherein said control device extends the duration of the rest period as the measured voltage increases during the charging process.

97. The battery charging apparatus of claim 48, wherein said control device is either microprocessor-based or is an application specific integrated circuit.

98. A method of formatting a battery by a battery charger adapted to provide alternating charge and discharge pulses to the battery, the formation method comprising the steps of:
   providing a first formation sequence comprising the steps of:
      a) applying a first charge pulse to the battery;
      b) resting a first wait period to allow the battery to at least partially stabilize;
      c) measuring the charge of the battery and repeating steps a) and b) until the battery reaches a first charge threshold, upon detecting the first charge threshold, transitioning the battery charger from the first formation sequence to a second formation sequence comprising the steps of:
      d) partially discharging the battery substantially immediately prior to applying a charge pulse to reduce the impedance of the battery;
      e) substantially immediately after discharging the battery, applying a charge pulse to the battery, the ratio of the duration of the charge pulse to the discharge pulse being greater than 10 to 1;
      f) resting a second wait period prior to applying a subsequent discharge pulse; and
      g) repeating steps d) through f) until the battery reaches a second charge threshold higher than said first charge threshold.

99. The battery formation method of claim 98, wherein the step of measuring the charge of the battery includes measuring the voltage level of the battery.

100. The battery formation method of claim 98, wherein the step of measuring the charge of the battery occurs during the discharge period.

101. The battery formation method of claim 98 further comprising the step of terminating the formation process upon detecting a bad battery condition based upon an excessive voltage level sensed at the beginning of the formation process.

102. The battery formation method of claim 98 further comprising the step of comparing a first measured battery voltage level with a subsequent second measured battery voltage level, and, upon detecting that the first measured value is greater than the second measured value, terminating the formation process.

103. The battery formation method of claim 98, wherein the charge pulse is a constant current charge.

104. The battery formation method of claim 98, wherein the battery charger is one of a microprocessor-based controller or an application specific integrated circuit.

105. A process for reconditioning a battery suffering from decreased charge capacity due to the effects of memory, the reconditioning process comprising the steps of:
   a) charging the battery over a period of time by a battery charger adapted to implement a charging process comprising the steps of:
      1) partially discharging the battery by means of a discharge pulse substantially Immediately prior to a charge pulse to reduce the impedance of the battery;
      2) substantially immediately after discharging the battery, applying a charge pulse to the battery, the ratio of the duration of the charge pulse to the discharge pulse being greater than 10 to 1;
      3) allowing the battery to at least partially stabilize by waiting a rest period prior to applying a subsequent discharge pulse; and
      4) repeating the above steps until the charging process is terminated;
   b) discharging a significant portion of the charge stored by the battery; and
   c) repeatedly recharging the battery according to steps 1) through 4) after each discharge of step b) until the battery substantially regains its original charge capacity, thereby enhancing battery performance and life.

106. The process of claim 105, wherein the battery charger provides a constant current supply to the battery.

107. The process of claim 105, wherein the battery substantially regains its original charge in about four to six repetitions of steps a) and b).

108. The process of claim 105, wherein the battery regains about 95% of its original charge capacity.

109. An apparatus for rapidly charging a plurality of battery types having different rated voltages and different rated charge capacities, said charging apparatus comprising:

an output adapted to be electrically connected to a battery;

a charge pulse generator add to provide a charge pulse at said output to charge the battery;

a discharge device adapted to provide a discharge pulse at said outlet to drain current from the battery to lower the impedance of the battery;

a control device alternatingly connecting said discharge device and said charge pulse generator to said output so as to alternatingly provide said discharge pulse, said charge pulse, and an electrically neutral rest period, respectively, to the battery, said discharge pulse, charge pulse, and rest period being applied to the battery in a predetermined standard charging sequence in which said discharge pulse is applied substantially immediately prior 1:0 said charge pulse, the ratio of the duration of the charge pulse to the discharge pulse being greater than 10 to 1, said control device adapted to deliver said charge pulse at a rate acceptable to any and all of the plurality of battery types according to the lowest current rating and the highest voltage rating of the plurality of battery types so as to provide an acceptable level of current drain from any one of the plurality of battery types being charged.

110. The battery charging apparatus of claim 109, wherein said charge current generator is a constant current supply.

111. The battery charging apparatus of claim 109, wherein said constant current supply is one of a linear or a switching constant current supply.

112. The battery charging apparatus of claim 109, wherein the battery is a lead-based type battery and the discharge device drains current from the battery at a rate of about five to six times the rated charge capacity of the battery.

113. The battery charging apparatus of claim 109, wherein the battery is a nickel-based secondary cell rechargeable battery.

114. The battery charging apparatus of claim 113, wherein the battery is one of a group consisting of Nickel Cadmium and Nickel Metal Hydride type batteries and the discharge device drains current from the battery at a rate of about two times the rated charge capacity of the battery.

115. The battery charging apparatus of claim 109, wherein said control device is one of a microprocessor-based controller and an application specific integrated circuit.

116. The battery charging apparatus of claim 109, wherein said discharge device is adapted to provide a selectable rate of current drain through the battery.

117. The battery charging apparatus of claim 116, wherein said control device is adapted to select the rate of current drain through the discharge device to match the particular type of battery being charged to optimize current drain through the battery.

118. The battery charging apparatus of claim 116, wherein said discharge device includes a plurality of resistors, each one of said resistors corresponding to one of a plurality of selectable rates of current drain through the battery.

119. The battery charging apparatus of claim 118, wherein the ohmic value of each of said plurality of resistors determines the rate at which power is dissipated from the battery and determines the ratio of the charge to discharge pulse durations.

120. The battery charging apparatus of claim 119, wherein said control device includes a microprocessor, and said microprocessor selects one of said resistors to effect a particular rate of current drain from the battery.

121. The battery charging apparatus of claim 119, wherein said control device includes a switch having a plurality of selectable positions corresponding and electrically connected to said plurality of resistors, and said switch is placed in a selected position corresponding to one of said resistors to effect a particular rate of current drain from the battery.

122. The battery charging apparatus of claim 116, wherein said control device is adapted to detect the type of battery connected to the battery charging apparatus.

123. A process for removing dendritic formations formed on a rechargeable battery to restore lost charging capacity to the battery, said dendritic removal process comprising the steps of:

charging the battery over a period of time by a battery charger adapted to implement a charging process comprising the steps of:
1) partially discharging the battery by means of a discharge pulse substantially immediately prior to a charge pulse to reduce the impedance of the battery;
2) substantially immediately after discharging the battery, applying a charge pulse to the battery, the ratio of the duration of the charge pulse to the discharge pulse being greater than 10 to 1;
3) allowing the battery to at least partially stabilize by waiting a rest period prior to applying a subsequent discharge pulse; and
4) repeating the above steps until the charging process is terminated;

b) discharging a significant portion of the charge stored by the battery; and c) repeatedly recharging the battery according to steps 1) through 4) after each discharge of step b) until the dendritic formations are significantly reduced, thereby enhancing battery performance and life.

124. The process of claim 123, wherein the battery charger includes a constant current supply.

125. The process of claim 123, wherein the constant current supply is one of a linear or a switching constant current supply.

126. The process of claim 123, wherein the battery is a lead-based type battery and the battery is discharged at a rate of about five to six times the rated charge capacity of the battery.

127. The process of claim 123, wherein the battery is a nickel-based secondary cell rechargeable battery.

128. The process of claim 127, wherein the battery is one of a group consisting of Nickel Cadmium and Nickel Metal Hydride type batteries and is discharged at a rate of about two times the rated charge capacity of the battery.

129. A method of aborting a battery charging process having alternating charging, discharging and wait periods, a battery charger providing a charge pulse during the charging period, a discharge pulse during the discharging period, and an electrically neutral stabilizing pause during the wait period, said aborting method comprising the steps of:

a) taking at least one measurement of the voltage level of the battery during the discharge period to arrive at a load voltage of the battery;

b) taking periodic measurements of the voltage level of the battery throughout the charging period to determine if a predetermined threshold voltage is exceeded;

c) aborting the charge pulse during the charging period if the threshold of step b) is exceeded and lengthening the wait period based upon the point in time at which the excessive voltage measurement was detected during the charging period;

d) at the end of the lengthened wait period of step c), partially discharging the battery and measuring the voltage level of the battery during the discharge period to determine if the measured load voltage exceeds the threshold voltage; and discontinuing the charging process if the voltage measured in step d) exceeds the threshold voltage of step b) or continuing the charging process if the voltage measured in step d) does not exceed the threshold voltage of step b).

130. A method of detecting and recovering a battery from an abnormal condition to a normal charging condition during a charging process having a standard charging sequence comprising alternating charge, discharge, and rest periods, said method comprising the following steps:

a) measuring the voltage level of the battery during the charging process;

b) upon measuring an abnormal voltage condition substantially in excess of the rated voltage of the battery, interrupting the standard charging sequence and waiting a predetermined stabilization wait period;

c) applying a discharge pulse to the battery at the end of the stabilization wait period; and d) measuring the voltage at the end of the discharge pulse and 1) returning to the standard charging sequence if the voltage measurement drops below the abnormal voltage condition or 2) terminating the charging process if the voltage measurement remains an abnormal voltage condition.

131. The method of claim 130, wherein the stabilization wait period is about in the range of 1 to 5 seconds.

132. The method of claim 130, wherein the battery is a nickel-based secondary cell rechargeable battery.

133. The method of claim 132, wherein the battery is one of a group consisting of Nickel Cadmium and Nickel Metal Hydride type batteries.

134. The method of claim 130, wherein the rated voltage of the battery is about 6 volts and the abnormal voltage condition is about equal to or greater than 15 volts.

135. A process of rapidly charging a battery by a battery charger having an input connected to a source of power, the battery charger providing alternating charge and discharge pulses to the battery, the charging process comprising the steps of:

a) applying a discharge pulse having a duration less than 10 milliseconds to partially discharge the battery substantially immediately prior to the charge pulse to lower the impedance and the voltage of the battery prior to the charge pulse being delivered to the battery;

b) after partially discharging the battery, supplying the charge pulse to the battery, the charge delivered to the battery during the charge pulse being greater than the charge drained from the battery during the discharge pulse of step a), and starting the charge pulse close enough in tine to the discharge pulse so that the voltage of the battery does not drift upwards a significant amount with respect to the loaded battery voltage as measured at or near the end of the discharge pulse;

c) waiting a rest period after the charge pulse and prior to applying a subsequent discharge pulse to the battery to allow the battery to at least partially stabilize; and d) repeating he above steps.

136. A process of rapidly charging a battery by a battery charger having an input connected to a source of power, the battery charger providing alternating charge and discharge pulses to the battery, the charging process comprising the steps of:

a) with the battery at a first voltage level, partially discharging the battery prior to the charge pulse to reduce the voltage of the battery to a second voltage level that is less than the first voltage level;

b) after partially discharging the battery, supplying the charge pulse to the battery, the charge delivered to the battery during the charge pulse being greater than the charge drained from the battery during the discharge pulse of step a), and starting the charge pulse with the battery essentially at the reduced second voltage level;

c) waiting a rest period after the charge pulse and prior to applying a subsequent discharge pulse to the battery to allow the battery to at least partially stabilize; and d) repeating the above steps.

137. The method of claim 136, wherein the charge pulse of step b) is applied immediately following the discharge pulse of step a).

138. The method of claim 136, wherein the charge pulse of step b) is applied within 4 milliseconds of the discharge pulse of step a).

139. A method of minimizing heat gain experienced by a rechargeable battery during a charging process of a battery charger having an input connected to a source of power, the charging process providing alternating charge and discharge pulses to the battery, said method comprising the following steps:

a) with the battery at a first voltage level, applying a predetermined discharge pulse and reducing the voltage level of the battery from the first voltage level to a second voltage level;

b) applying a charge pulse substantially immediately after the discharge pulse with the battery essentially at the second voltage level at the beginning of the charge pulse, the charge pulse raising the battery voltage to a third voltage level greater than the first voltage level;

c) waiting a rest period after the charge pulse and prior to applying a subsequent discharge pulse to the battery to allow the battery to at least partially stabilize, the rest period being substantially shorter in duration than the charge pulse of step b) over the majority of the charging process; and d) repeating the above steps.

140. The method of claim 139 further comprising the step of determining an optimum charge pulse duration based upon the relationship between the first, second, and third voltage levels so as to maximize the charge pulse duration and minimize the duration of the charge process.

141. The method of claim 140 further comprising the step of determining an optimum discharge pulse duration and magnitude based upon the relationship between the first, second, and third voltage levels so as to maximize the charge pulse duration and minimize the duration of the charge process.

142. A method of maximizing the charge delivered to a rechargeable battery while minimizing heat generation during the process of recharging the battery by a battery charger having an input connected to a source of power, the battery charger providing alternating charge and discharge pulses to the battery, said method comprising the following steps:

a) applying a predetermined discharge pulse having a duration and magnitude;

b) applying a charge pulse essentially immediately after terminating the discharge pulse;

c) matching the discharge pulse duration and magnitude with the charging pulse duration and magnitude so that the discharge pulse lowers the impedance of the battery to an optimum level to best match the predetermined charge pulse for optimum charging, whereby the charge pulse duration is lengthened to an optimum period while minimizing the total battery charge time;

d) waiting an electrically-neutral rest period after the charge pulse and prior to applying a subsequent discharge pulse to the battery to allow the battery to at least partially stabilize, the rest period being substantially shorter in duration than the charge period of step b) over the majority of the charging process; and e) repeating the above steps.

143. A method of essentially eliminating heat generation during the process of recharging a battery by a battery charger having an input connected to a source of power, the battery charger providing alternating charge and discharge pulses to the battery, said method comprising the following steps:

a) applying a predetermined discharge pulse having a duration and magnitude;

b) applying a charge pulse essentially immediately after terminating the discharge pulse;

c) matching the discharge pulse duration and magnitude with the charging pulse duration and magnitude so that the discharge pulse lowers the impedance of the battery to an optimum level to best match the predetermined charge pulse for optimum charging, whereby the charge pulse is lengthened to an optimum period while minimizing the total battery charge time;

d) waiting an electrically-neutral rest period after the charge pulse and prior to applying a subsequent discharge pulse to the battery to allow the battery to at least partially stabilize, the rest period being substantially shorter in duration than the charge period of step b) over the majority of the charging process; and e) repeating the above steps.

* * * * *

UNITED STATES PATENT AND TRADEMARK OFFICE
CERTIFICATE OF CORRECTION

PATENT NO  :  5,998,968
DATED      :  December 7, 1999
INVENTOR(S):  Ron Pittman et al.

It is certified that error appears in the above-identified patent and that said Letters Patent is hereby corrected as shown below:

On the title page: Item [75]

Inventor-after Stefansson delete "Gilbert" and substitute therefor --Chandler--

In the Claims

Claim 18, Column 24, Line 29
after "about" insert --between--
Claim 109, Column 31, Line 2
delete "add" and substitute therefor --adapted--
Claim 109, Column 31, Line 15
delete "1:0" and substiture therefor --to--
Claim 135, Column 33, Line 53
delete "tine" and substitute therefor --time--
Claim 135, Column 33, Line 60
delete "he" and substitute therefor --the--

Signed and Sealed this

Eighteenth Day of July, 2000

Q. TODD DICKINSON

*Attest:*

*Attesting Officer*     *Director of Patents and Trademarks*